(12) United States Patent
Go et al.

(10) Patent No.: US 12,526,348 B2
(45) Date of Patent: Jan. 13, 2026

(54) VEHICLE-MOUNTED RELAY DEVICE, VEHICLE-MOUNTED COMMUNICATION SYSTEM, AND COMMUNICATION CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Darmawan Go, Yokkaichi (JP); Hirofumi Urayama, Yokkaichi (JP); Tomohiro Otsu, Yokkaichi (JP); Yoshitaka Kikuchi, Yokkaichi (JP); Tatsuya Izumi, Osaka (JP); Hideyuki Tanaka, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 46 days.

(21) Appl. No.: 18/551,623

(22) PCT Filed: Mar. 17, 2022

(86) PCT No.: PCT/JP2022/012215
§ 371 (c)(1),
(2) Date: Sep. 21, 2023

(87) PCT Pub. No.: WO2022/209946
PCT Pub. Date: Oct. 6, 2022

(65) Prior Publication Data
US 2024/0187503 A1 Jun. 6, 2024

(30) Foreign Application Priority Data

Mar. 31, 2021 (JP) .................................. 2021-059904

(51) Int. Cl.
*H04L 69/08* (2022.01)
*H04L 67/12* (2022.01)

(52) U.S. Cl.
CPC .............. *H04L 69/08* (2013.01); *H04L 67/12* (2013.01)

(58) Field of Classification Search
CPC ............................... H04L 67/12; H04L 69/08
See application file for complete search history.

(56) References Cited

U.S. PATENT DOCUMENTS

| 6,920,380 B2 * | 7/2005 | McClure | ............... | B60W 50/04 |
| | | | | 701/1 |
| 7,801,162 B2 * | 9/2010 | Jeon | ........................ | H04L 12/66 |
| | | | | 370/402 |

(Continued)

FOREIGN PATENT DOCUMENTS

| JP | 2009-027245 A | 2/2009 |
| JP | 2009-161103 A | 7/2009 |

(Continued)

OTHER PUBLICATIONS

International Search Report, Application No. PCT/JP2022/012215, mailed Jun. 7, 2022. ISA/Japan Patent Office.

*Primary Examiner* — G. C. Neurauter, Jr.
(74) *Attorney, Agent, or Firm* — Honigman LLP

(57) ABSTRACT

The vehicle-mounted relay device in a vehicle-mounted communication system provided with a plurality of vehicle-mounted devices, the vehicle-mounted relay device includes: a relay unit configured to relay communication data between the plurality of vehicle-mounted devices; and a processing unit configured to, before communication is (Continued)

started between the vehicle-mounted devices, notify the vehicle-mounted devices of a common protocol that is a common communication protocol to be used.

15 Claims, 15 Drawing Sheets

(56) References Cited

U.S. PATENT DOCUMENTS

| | | | |
|---|---|---|---|
| 9,129,532 B2* | 9/2015 | Rubin | G08G 1/163 |
| 11,122,151 B2* | 9/2021 | Tessiore | H04L 67/565 |
| 11,362,859 B2* | 6/2022 | Yamamoto | H04L 12/40169 |
| 2010/0198427 A1* | 8/2010 | Fogelstrum | H04W 4/48 |
| | | | 701/1 |
| 2011/0029644 A1* | 2/2011 | Gelvin | H04L 43/16 |
| | | | 709/220 |
| 2017/0072876 A1* | 3/2017 | Rajan | H04L 12/66 |
| 2018/0324640 A1* | 11/2018 | Kaneko | H04W 4/40 |
| 2020/0274927 A1* | 8/2020 | Richmond | H04L 67/12 |
| 2020/0389341 A1* | 12/2020 | Li | H04W 4/38 |
| 2021/0126917 A1* | 4/2021 | Lin | H04L 12/40032 |
| 2024/0045657 A1* | 2/2024 | Ma | G06F 9/542 |

FOREIGN PATENT DOCUMENTS

| | | |
|---|---|---|
| JP | 2014-204315 A | 10/2014 |
| JP | 2016-158105 A | 9/2016 |

\* cited by examiner

FIG. 3

[Before update: defaults]

| Physical port | Transmission source | Transmission destination | UDP / TCP | Service | Control content | Rule |
|---|---|---|---|---|---|---|
| Communication port 24A | Gateway device 101A | Vehicle-mounted ECU 111B | UDP | — | Permit passage (transfer to communication port 24C) | Rule11 |
| | any | Multicast | UDP | X (Protocol P1) | Prohibit relay processing (transfer to conversion processing unit) | Rule12 |
| | any | any | any | any | Discard | Rule13 |
| Communication port 24B | ... | ... | ... | ... | ... | ... |
| Communication port 24C | Vehicle-mounted ECU 111B | Gateway device 101A | UDP | — | Permit passage (transfer to communication port 24C) | Rule31 |
| | any | Multicast | UDP | X (Protocol P1) | Prohibit relay processing (transfer to conversion processing unit) | Rule32 |
| | any | any | any | any | Discard | Rule33 |

| Service | Protocol | Client | Server | MsgID | ReqID | Version | MsgType | Data |
|---|---|---|---|---|---|---|---|---|
| X (global) | P1 | Gateway device 101A | (Gateway device 101B) | 0104 | 03xx | Ver1.0 | Req/Res/Sub /Pub/Err | ... |
| | P2 | (Gateway device 101B) | Vehicle-mounted ECU 111B | 02 | — | — | Sub/Pub | ... |
| | P3 | — | — | — | — | — | — | — |
| Y (local) | P1 | (Gateway device 101B) | Vehicle-mounted ECU 111B | 01 | — | — | Sub/Pub | ... |
| | P2 | Vehicle-mounted ECU 111A | (Gateway device 101B) | 8A01 | — | — | Sub/Pub/ Req/Res | ... |
| | P3 | | | | | | | |
| ... | | | | | | | | |

Ta2

FIG. 5 [After update: after determination of the same protocol]

| Physical port | Transmission source | Transmission destination | UDP/TCP | Service | Control content | Rule |
|---|---|---|---|---|---|---|
| Communication port 24A | Gateway device 101A | Vehicle-mounted ECU 111B | UDP | — | Permit passage (transfer to communication port 24C) | Rule 11 |
| | Gateway device 101A | Multicast | UDP | X (Protocol P1) | Permit passage (transfer to communication port 24C) | Rule 12 |
| | any | any | any | any | Discard | Rule 13 |
| Communication port 24B | ... | ... | ... | ... | ... | ... |
| Communication port 24C | Vehicle-mounted ECU 111B | Gateway device 101A | UDP | — | Permit passage (transfer to communication port 24A) | Rule 31 |
| | Vehicle-mounted ECU 111B | Multicast | UDP | X (Protocol P1) | Permit passage (transfer to communication port 24A) | Rule 32 |
| | any | any | any | any | Discard | Rule 33 |

Service X is not available

Service X is available if you switch to manual driving.
Do you switch to manual driving?

YES  NO

VEHICLE-MOUNTED RELAY DEVICE, VEHICLE-MOUNTED COMMUNICATION SYSTEM, AND COMMUNICATION CONTROL METHOD

CROSS-REFERENCE TO RELATED APPLICATIONS

This application is the U.S. national stage of PCT/JP2022/012215 filed on Mar. 17, 2022, which claims priority of Japanese Patent Application No. JP 2021-059904 filed on Mar. 31, 2021, the contents of which are incorporated herein.

TECHNICAL FIELD

The present disclosure relates to a vehicle-mounted relay device, a vehicle-mounted communication system, and a communication control method.

BACKGROUND

JP 2009-161103AJP 2009-161103A discloses a vehicle control device such as that described below. That is, the control device controls behavior of a component that is installed in a vehicle and is to be controlled. An intra box detects a change in system configuration such as replacement of a control device provided from a different source, retrofitting of a control device, or updates to software and hardware, via a communication system. A communication setting means of the intra box adjusts communication settings for control devices based on the detected system configuration. A processing device serving as hardware such as a CPU, a ROM, a RAM, and a flash memory that constitute the intra box is constituted by an independent processing device that is different from the control device.

JP 2009-27245A discloses a conversion unit such as that described below. That is, the conversion unit is a conversion unit for connecting a first network and a second network, and includes; a gateway conversion processing unit; a first converter for performing conversion between a data format used in the gateway conversion processing unit and a data format used in the first network; and a second converter for performing conversion between a data format used in the gateway conversion processing unit and a data format used in the second network.

If communication protocols used by vehicle-mounted devices are different from each other, communication data cannot be transmitted and received between these vehicle-mounted devices.

The above-described vehicle control device disclosed in JP 2009-161103A does not mention a method that deals with a case where communication protocols of vehicle-mounted devices are different from each other. Also, in the conversion unit disclosed in JP 2009-27245A, a gateway processing unit performs protocol conversion for all communications between an existing network and an added network, thus resulting in problems including an increase in the processing load of the gateway processing unit and an increase in the communication volume between the networks.

The present disclosure was made to solve the above-described problems, and it is an object thereof to provide a vehicle-mounted relay device, a vehicle-mounted communication system, and a communication control method that, when communication protocols of vehicle-mounted devices are different from each other, enables communication between the vehicle-mounted devices while suppressing the load.

Conventionally, techniques have been developed for adjusting communication settings based on a change of system configuration in a vehicle-mounted network. Also, techniques have been developed for converting a data format when a new network is added to an existing vehicle-mounted network.

SUMMARY

A vehicle-mounted relay device according to the present disclosure is a vehicle-mounted relay device in a vehicle-mounted communication system provided with a plurality of vehicle-mounted devices, the vehicle-mounted relay device includes: a relay unit configured to relay communication data between the plurality of vehicle-mounted devices; and a processing unit configured to, before communication is started between the vehicle-mounted devices, notify the vehicle-mounted devices of a common protocol that is a common communication protocol to be used.

A vehicle-mounted communication system according to the present disclosure includes: a plurality of vehicle-mounted devices including a vehicle-mounted relay device, wherein the vehicle-mounted relay device is configured to relay communication data between the plurality of vehicle-mounted devices, the vehicle-mounted relay device is configured to notify, before communication is started between the vehicle-mounted devices, the vehicle-mounted devices of a common protocol that is a common communication protocol to be used, and upon receiving a notification of the common protocol, the vehicle-mounted devices determine whether or not to switch to communication using the common protocol.

A communication control method according to the present disclosure is a communication control method that is performed by a vehicle-mounted relay device included in a vehicle-mounted communication system provided with a plurality of vehicle-mounted devices, the vehicle-mounted relay device relaying communication data between the plurality of vehicle-mounted devices, the method includes: a step of selecting, before communication is started between the vehicle-mounted devices, a common protocol that is a common communication protocol to be used, and a step of notifying the vehicle-mounted devices of the selected common protocol.

One aspect of the present disclosure can be realized not only as a vehicle-mounted relay device that includes such characteristic processing units, but also as a program for enabling a computer to carry out such characteristic processing steps. Also, one aspect of the present disclosure can be realized as a semiconductor integrated circuit that realizes a part or the entirety of the vehicle-mounted relay device.

One aspect of the present disclosure can be realized not only as a vehicle-mounted communication system that includes such characteristic processing units, but also as a communication control method for carrying out such characteristic processing as steps, or as a program for enabling a computer to carry out such steps. Also, one aspect of the present disclosure can be realized as a semiconductor integrated circuit that realizes a part or the entirety of the vehicle-mounted communication system.

Effects of the Present Disclosure

According to the present disclosure, when the communication protocols of the vehicle-mounted devices are different from each other, it is possible to perform communication between the vehicle-mounted devices while suppressing the load.

BRIEF DESCRIPTION OF THE DRAWINGS

FIG. 3 is a diagram showing an example of the relay rule table stored in the vehicle-mounted relay device according to the embodiment of the present disclosure.

FIG. 4 is a diagram showing a list of types of convertible communication protocols used for communication data used in services, the list being stored in the vehicle-mounted relay device according to the embodiment of the present disclosure.

FIG. 5 is a diagram showing an example of the relay rule table after the update of the conversion processing unit of the vehicle-mounted relay device according to the embodiment of the present disclosure.

FIG. 6 is a diagram showing an example of the screen displayed by the conversion processing unit of the vehicle-mounted relay device according to the embodiment of the present disclosure.

DETAILED DESCRIPTION OF PREFERRED EMBODIMENTS

Figure 1:
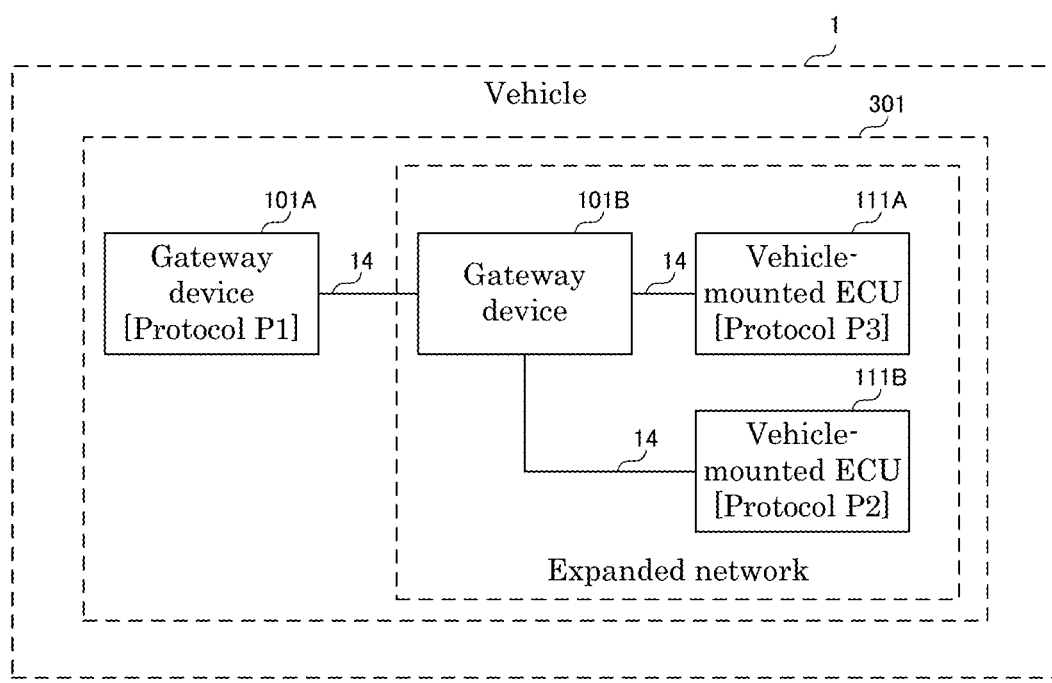
FIG. 1 is a diagram showing a configuration of a vehicle-mounted communication system according to an embodiment of the present disclosure.

First, the details of an embodiment of the present disclosure are listed and described.

A vehicle-mounted relay device according to an embodiment of the present disclosure is a vehicle-mounted relay device in a vehicle-mounted communication system provided with a plurality of vehicle-mounted devices, the vehicle-mounted relay device includes: a relay unit configured to relay communication data between the plurality of vehicle-mounted devices; and a processing unit configured to, before communication is started between the vehicle-mounted devices, notify the vehicle-mounted devices of a common protocol that is a common communication protocol to be used.

With this configuration, for example, even when the communication protocols of the vehicle-mounted devices are different from each other, each vehicle-mounted device switches its communication protocol to the common protocol, thus eliminating the need to perform conversion processing of the communication protocol in the vehicle-mounted relay device. For example, since the vehicle-mounted relay device can check whether or not conversion processing of the communication protocol is needed, and can perform the conversion processing as needed, it is possible to suppress, for example, an increase in the processing load of the vehicle-mounted relay device and an increase in the communication volume in the vehicle-mounted communication system. Accordingly, when the communication protocols of the vehicle-mounted devices are different from each other, it is possible to perform communication between the vehicle-mounted devices while suppressing the load.

A configuration is possible in which, if the processing unit receives, from all of the vehicle-mounted devices notified of the common protocol, notifications that the vehicle-mounted devices have determined not to use the common protocol, the processing unit determines whether or not to perform conversion processing of a communication protocol for communication data to be transmitted and received between the vehicle-mounted devices.

With this configuration, when at least one of the vehicle-mounted devices uses the common protocol, the conversion processing of the communication protocol is not performed by the vehicle-mounted relay device, making it possible to suppress an increase in the processing load of the vehicle-mounted relay device and an increase in the communication volume in the vehicle-mounted communication system. Also, even if both of the vehicle-mounted devices do not use the common protocol, the vehicle-mounted devices can communicate with each other when the conversion processing of the communication protocol is performed by the vehicle-mounted relay device. Furthermore, with the configuration in which it is determined whether or not to perform the conversion processing of the communication protocol, it is possible to appropriately select the timing at which the conversion processing is performed based on, for example, the state of the vehicle, or the like.

A configuration is possible in which the processing unit determines whether or not to perform the conversion processing, based on a driving state of a vehicle in which the vehicle-mounted communication system is mounted.

With this configuration, for example, by determining not to perform the conversion processing of the communication protocol when the vehicle is traveling using automated driving, it is possible to appropriately suppress an increase in the load in the vehicle-mounted communication system.

A configuration is possible in which the processing unit determines whether or not to perform the conversion processing, based on a communication state of the vehicle-mounted communication system.

With this configuration, for example, by determining not to perform the conversion processing of the communication protocol when the communication volume of the vehicle-mounted communication system per unit of time is equal to or greater than a predetermined threshold, it is possible to appropriately suppress an increase in the load in the vehicle-mounted communication system.

A configuration is possible in which the processing unit determines whether or not to perform the conversion processing on a regular basis or on an irregular basis.

With this configuration, it is possible to appropriately determine whether or not to perform the conversion processing of the communication protocol based on a change in the state of the vehicle, or the like.

A configuration is possible in which, when the conversion processing has been performed by the processing unit, the relay unit adds, to communication data for which the conversion processing has been performed, information indicating that the communication protocol has been converted, and relays the communication data.

With this configuration, on the receiving side of the communication data, it is possible to perform processing that takes into consideration the impact of the conversion processing, such as for example setting an elongated delay permission time for the communication data.

A configuration is possible in which, when the conversion processing has been performed by the processing unit, the relay unit adds, to communication data for which the conversion processing has been performed, information indicating a communication protocol used prior to the conversion processing, and relays the communication data.

With this configuration, on the receiving side of the communication data, it is possible to perform communication that takes into consideration a difference in communication protocol, such as for example communication in which the use of a communication protocol before conversion is suppressed.

A configuration is possible in which, when the conversion processing has been performed by the processing unit, the relay unit adds, to communication data for which the conversion processing has been performed, information indicating a condition for stopping the conversion processing, and relays the communication data.

With this configuration, on the receiving side of the communication data, it is possible to implement a countermeasure that corresponds to the content of the condition, such as suppressing an increase in the communication volume of the receiving side.

A configuration is possible in which, if the processing unit determines not to perform the conversion processing, the processing unit performs processing for displaying a notification that the conversion processing is not to be performed, and a condition for performing the conversion processing on a screen.

With this configuration, for example, it is possible to allow a user to prioritize between a service scheduled to be provided in response to the execution of the conversion processing of the communication protocol, and a currently provided service, making it possible to provide the service more suitable for the desire of the user.

A configuration is possible in which the vehicle-mounted relay device further includes a storage unit storing relay permission information relating to relaying of communication data in a TCP/IP (Transmission Control Protocol/Internet Protocol) layer, wherein the processing unit performs protocol determination of determining whether or not there is a difference in communication protocol between the vehicle-mounted devices, the relay permission information indicates that the relaying of the communication data between the vehicle-mounted devices in the TCP/IP layer is prohibited before a determination result of the protocol determination performed by the processing unit is obtained, and if, in the protocol determination, it is determined that the communication protocols of the vehicle-mounted devices match each other, the processing unit changes content of the relay permission information to content that the relaying of the communication data between the vehicle-mounted devices in the TCP/IP layer is to be permitted, and if it is determined that the communication protocols of the vehicle-mounted devices are different from each other, the processing unit notifies the vehicle-mounted devices of the common protocol.

With this configuration, for communication between vehicle-mounted devices whose communication protocols have been determined to match each other, it is possible to easily make determination to permit the relaying of data in the communication thereafter with reference to the relay permission information, without determining whether or not there is a difference in communication protocol. Also, by giving a notification of a common protocol if the communication protocols of the vehicle-mounted devices are different from each other, it is possible to avoid unnecessary notification of the common protocol.

A configuration is possible in which the vehicle-mounted relay device further includes a storage unit storing conversion information that indicates a list of types of convertible communication protocols for use in a service provided by the vehicle-mounted communication system.

With this configuration, it is possible to easily select the common protocol by checking the conversion information.

A configuration is possible in which the conversion information indicates a list of types of communication protocols associated with each service.

With this configuration, focusing on the type of service in which communication data is to be used, it is possible to easily select the common protocol that corresponds to the service.

A configuration is possible in which a plurality of services provided by the vehicle-mounted communication system include at least one of a service realized between the vehicle-mounted devices belonging to different networks, and a service realized between the vehicle-mounted devices belonging to the same network.

With this configuration, in both cases where the service to be provided is a service realized between vehicle-mounted devices belonging to different networks, and where the service to be provided is a service realized between the vehicle-mounted devices belonging to the same network, it is possible to easily select the common protocol corresponding to the service.

A vehicle-mounted communication system according to an embodiment of the present disclosure includes: a plurality of vehicle-mounted devices including a vehicle-mounted relay device, wherein the vehicle-mounted relay device is configured to relay communication data between the plurality of vehicle-mounted devices, the vehicle-mounted relay device is configured to notify, before communication is started between the vehicle-mounted devices, the vehicle-mounted devices of a common protocol that is a common communication protocol to be used, and upon receiving a notification of the common protocol, the vehicle-mounted devices determine whether or not to switch to communication using the common protocol.

With this configuration, for example, even when the communication protocols of the vehicle-mounted devices are different from each other, each vehicle-mounted device switches its communication protocol to the common protocol, thus eliminating the need to perform conversion processing of the communication protocol in the vehicle-mounted relay device. For example, since the vehicle-mounted relay device can check whether or not conversion processing of the communication protocol is needed, and can perform the conversion processing as needed, it is possible to suppress, for example, an increase in the processing load of the vehicle-mounted relay device and an increase in the communication volume in the vehicle-mounted communication system. Accordingly, when the communication protocols of the vehicle-mounted devices are different from each other, it is possible to perform communication between the vehicle-mounted devices while suppressing the load.

A communication control method according to an embodiment of the present disclosure is a communication control method that is performed by a vehicle-mounted relay device included in a vehicle-mounted communication system provided with a plurality of vehicle-mounted devices, the vehicle-mounted relay device relaying communication data between the plurality of vehicle-mounted devices, the method includes: a step of selecting, before communication is started between the vehicle-mounted devices, a common protocol that is a common communication protocol to be used, and a step of notifying the vehicle-mounted devices of the selected common protocol.

With this method, for example, even when the communication protocols of the vehicle-mounted devices are different from each other, each vehicle-mounted device switches its communication protocol to the common protocol, thus eliminating the need to perform conversion processing of the communication protocol in the vehicle-mounted relay device. For example, since the vehicle-mounted relay device can check whether or not conversion processing of the communication protocol is needed, and can perform the conversion processing as needed, it is possible to suppress, for example, an increase in the processing load of the vehicle-mounted relay device and an increase in the communication volume in the vehicle-mounted communication system. Accordingly, when the communication protocols of the vehicle-mounted devices are different from each other, it is possible to perform communication between the vehicle-mounted devices while suppressing the load.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation

Configuration of Vehicle-Mounted Communication System

FIG. 1 is a diagram showing a configuration of a vehicle-mounted communication system according to an embodiment of the present disclosure.

Referring to FIG. 1, a vehicle-mounted communication system 301 includes a gateway device 101A, a gateway device (vehicle-mounted relay device) 101B, a vehicle-mounted ECU (Electronic Control Unit) 111A, and a vehicle-mounted ECU 111B. The vehicle-mounted communication system 301 is mounted in a vehicle 1.

Hereinafter, the gateway devices 101A and 101B are each also referred to as a gateway device 101. Also, the vehicle-mounted ECUs 111A and 111B are each also referred to as a vehicle-mounted ECU 111. Also, the gateway device 101 and the vehicle-mounted ECU 111 are each also referred to as a vehicle-mounted device.

Note that the vehicle-mounted communication system 301 is not limited to the configuration in which it includes two gateway devices 101, and the vehicle-mounted communication system 301 may include one gateway device 101 or three or more gateway devices 101. Also, the vehicle-mounted communication system 301 is not limited to the configuration in which it includes two vehicle-mounted ECUs 111, and the vehicle-mounted communication system 301 may include one vehicle-mounted ECU 111, or three or more vehicle-mounted ECUs 111.

Also, the vehicle-mounted communication system 301 may be configured to include, as a vehicle-mounted device, consumer equipment temporality mounted in the vehicle 1. Examples of the consumer equipment include a terminal device such as a smartphone and a USB (Universal Serial Bus) memory.

Examples of the vehicle-mounted ECU 111 include EPS (Electric Power Steering), a brake control device, an accelerator control device, a steering control device, a driver-assistance device that gives instructions or the like to various types of devices in an ADAS (Advanced Driver-Assistance System), and a sensor.

The gateway device 101 performs relay processing for relaying communication data between a plurality of vehicle-mounted devices connected to different cables 14 in the vehicle 1, for example. The cables 14 are cables conforming to the Ethernet (registered trademark) standard, for example.

In the vehicle-mounted communication system 301, communication data is transmitted and received in accordance with a communication protocol, such as SOME/IP (Scalable service-Oriented MiddlewarE over/Internet Protocol), MQTT (Message Queueing Telemetry Transport), OPC UA (OPC Unified Architecture) or CoAP (Constrained Application Protocol), of the application layer above the TCP/IP (Transmission Control Protocol/Internet Protocol) in the Ethernet protocol group, for example.

As a result of the vehicle-mounted devices of the vehicle-mounted communication system 301 communicating with each other, provision of a service of the vehicle 1 is realized. It is assumed that, for example, a sensor that is a vehicle-mounted device transmits sensor information relating to the travel state of the vehicle 1 or the state of the surroundings of the vehicle 1 to a driver-assistance device that is another vehicle-mounted device. In this case, the sensor transmits the sensor information to the driver-assistance device, as provision of a service. The driver-assistance device receives the sensor information provided as a service from the sensor, generates various types of control information relating to the driving of the vehicle 1 based on the sensor information, and transmits the various types of generated control information to the brake control device, the steering control device, and the like, thereby realizing an application such as a safe driving assistance application.

Hereinafter, the vehicle-mounted device that provides a service is also referred to as a "server". Also, the vehicle-mounted device to which a service is provided is also referred to as a "client".

Description of Problems

It is assumed here that the gateway device 101B, the vehicle-mounted ECU 111A, and the vehicle-mounted ECU 111B are newly connected to an existing vehicle-mounted network (hereinafter, also referred to as an "existing network"). That is to say, it is assumed that the gateway device 101B is newly added to the existing gateway device 101A of the vehicle-mounted communication system 301, and the vehicle-mounted ECUs 111A and 111B are connected to the gateway device 101B. Hereinafter, the network including the gateway device 101B, the vehicle-mounted ECU 111A, and the vehicle-mounted ECU 111B is also referred to as an "expanded network".

The gateway device 101A is a device that performs communication in accordance with a communication protocol P1, the vehicle-mounted ECU 111A is a device that performs communication in accordance with a communication protocol P3, and the vehicle-mounted ECU 111B is a device that performs communication in accordance with a communication protocol P2.

For example, it is assumed that the gateway device 101A is a client of a service X to be provided in the vehicle 1, and has multicast communication data including a search message of searching for a server that is a provider of the service X. In this case, the communication data transmitted from the gateway device 101A is received by the gateway device 101B, and the received communication data is transmitted from the gateway device 101B to the vehicle-mounted ECU 111A and the vehicle-mounted ECU 111B.

Also, it is assumed that the vehicle-mounted ECU 111B is a server of the service X. In this case, if a communication connection is established between the gateway device 101A that is a client and the vehicle-mounted ECU 111B that is a server, the service X can be used.

However, as described above, since the communication protocols of the gateway device 101A and the vehicle-mounted ECU 111B are different, no communication connection can be established therebetween, causing a problem where the service X cannot be used. Also, due to failure of establishment of a communication connection between the gateway device 101A and the vehicle-mounted ECU 111B, the number of times communication data is retransmitted may increase.

Therefore, with the following configuration, the gateway device 101B according to the embodiment of the present disclosure performs communication between vehicle-mounted devices while suppressing the load, when the vehicle-mounted devices have different communication protocols. Hereinafter, the gateway device 101B will be described in more detail.

Configuration of Gateway Device 101B

Figure 2:
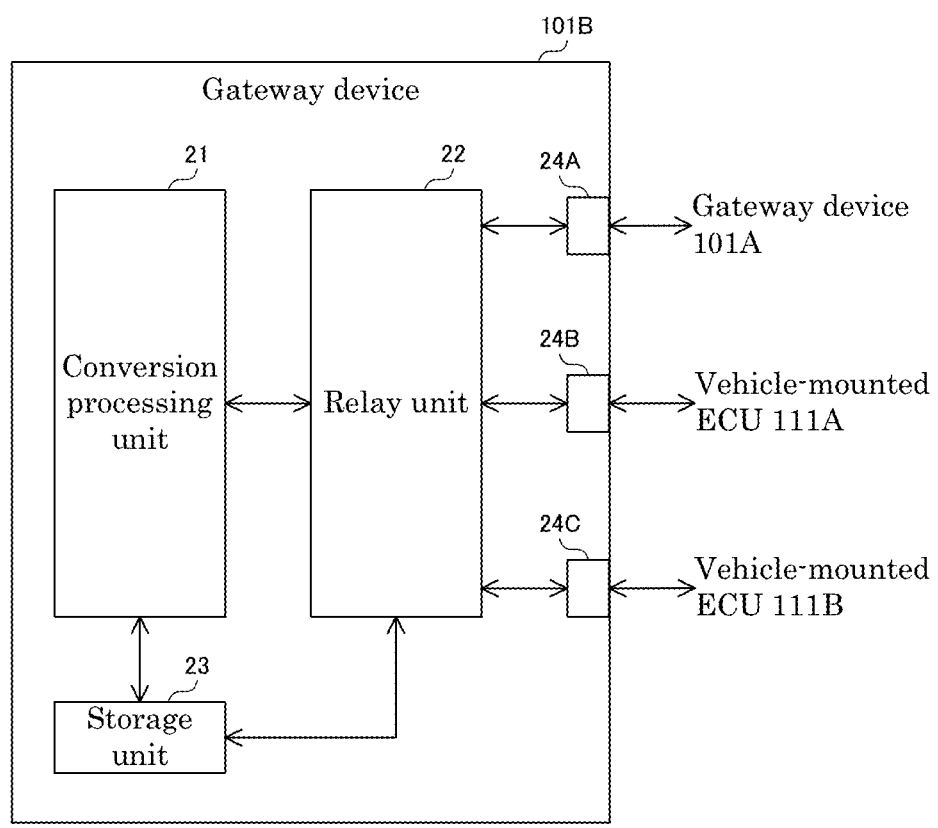
FIG. 2 is a diagram showing an example of a configuration of the gateway device according to the embodiment of the present disclosure.

FIG. 2 is a diagram showing an example of a configuration of the gateway device according to the embodiment of the present disclosure.

The gateway device 101B includes a conversion processing unit (processing unit) 21, a relay unit 22, a storage unit 23, and three communication ports 24. The conversion processing unit 21 and the relay unit 22 are realized by a processor such as a CPU (Central Processing Unit) or a DSP (Digital Signal Processor), for example. The storage unit 23 is a nonvolatile memory, for example.

Note that the gateway device 101B is not limited to a configuration in which three communication ports 24 are provided, and a configuration is also possible in which two, or four or more communication ports 24 are provided.

The communication port 24 is a terminal to which the cable 14 can be connected, for example. Each communication port 24 can be connected to a vehicle-mounted device of the vehicle 1. In this example, the communication ports 24, namely, three communication ports 24A, 24B, and 24C, are respectively connected to the gateway device 101A, the vehicle-mounted ECU 111A, and the vehicle-mounted ECU 111B via the cables 14.

Checking of Application Rule by Relay Unit

The storage unit 23 stores a relay rule table (relay permission information) Ta1 relating to the relaying of communication data in the TCP/IP layer.

FIG. 3 is a diagram showing an example of the relay rule table stored in the vehicle-mounted relay device according to the embodiment of the present disclosure.

Referring to FIG. 3, the relay rule table Ta1 includes, for each communication port 24 of the gateway device 101B, a set of Transmission source, Transmission destination, Communication protocol in the TCP/IP layer, and Type of service of communication data to be received, and Content of control to be performed on the communication data.

For example, the relay rule table Ta1 specifies a rule 11 that passage of communication data is to be permitted and relay processing is to be performed, for the communication data that is received from the communication port 24A, is originated from the gateway device 101A, has a destination to the vehicle-mounted ECU 111B, and uses a UDP (User Datagram Protocol) as a communication protocol.

Also, the relay rule table Ta1 specifies a rule 12 that communication data is to be prohibited from being relayed and is to be output to the conversion processing unit 21, for the communication data that is received from the communication port 24A, is multicast data, uses a UDP as a communication protocol, and is used for the service X.

The relay rule table Ta1 also specifies a rule 13 that the communication data is to be discarded, for the communication data that is received from the communication port 24A and is applicable to none of the above-described rules A1 and A2.

Upon receiving communication data via the communication port 24, the relay unit 22 checks, for example, a header portion of the application layer in the frame in which the communication data is stored to identify the rule to be applied to the communication data. Then, the relay unit 22 performs relay processing of relaying the communication data, outputs the communication data to the conversion processing unit 21, or discards the communication data, in accordance with the control content of the checked rule.

Relay Processing Performed by Relay Unit

In the storage unit 23, an ARL table (Address Resolution Logic) is further stored. The ARL table defines a correspondence relationship between the MAC address of each vehicle-mounted device and the logical port number of the communication port 24 connected to this vehicle-mounted device, for example.

When performing relay processing of relaying the received communication data in accordance with the rule specified in the relay rule table Ta1, the relay unit 22 refers to a transmission destination MAC address included in the frame in which the communication data is stored. Then, the relay unit 22 specifies the output transmission destination that corresponds to the referred transmission destination MAC address from the ARL table, and transmits the frame to the corresponding vehicle-mounted device via the communication port 24 that is the specified output destination.

Processing Corresponding to Protocol Determination by Conversion Processing Unit and Determination Result Thereof FIG. 4 is a diagram showing a list of types of convertible communication protocols used for communication data used in services, the list being stored in the vehicle-mounted relay device according to the embodiment of the present disclosure.

Referring to FIG. 4, the storage unit 23 further stores a conversion table (conversion information) Ta2 that defines a list of types of convertible communication protocols used in services that are provided by the vehicle-mounted communication system 301.

A plurality of services that are provided by the vehicle-mounted communication system 301 include at least one of a service realized between vehicle-mounted devices belonging to different networks and a service realized between vehicle-mounted devices belonging to the same network.

For example, the conversion table Ta2 defines a list of types of communication protocols for individual services. Specifically, the conversion table Ta2 specifies that, for communication data used in the service X realized by global communication between a vehicle-mounted device belonging to the existing network and a vehicle-mounted device belonging to the expanded network, the conversion of the communication protocols between P1 and P2 in a layer above the TCP/IP layer is possible.

Also, the conversion table Ta2 specifies that, for communication data used in a service Y realized by local communication between a plurality of vehicle-mounted devices belonging to the expanded network, the conversion of the communication protocols between P2 and P3 in the layer above the TCP/IP layer is possible.

Upon receiving communication data output from the relay unit 22 in accordance with the rule specified in the relay rule table Ta1 in FIG. 3, the conversion processing unit 21 checks, for example, the header portion of the application layer of the frame in which the communication data is stored, and acquires information (hereinafter, also referred to as "service information") relating to the service for which the communication data is to be used.

More specifically, the conversion processing unit 21 acquires, as service information, Communication protocol of the layer above the TCP/IP layer, Client, Server, Message ID, Request ID, Version, Message type, and the like, and registers the acquired service information in the conversion table Ta2.

Specifically, when receiving communication data (hereinafter, also referred to as "search data") including a message of searching for the service X, the conversion processing unit 21 registers, for example, "P1" as Communication protocol of the search data, "gateway device 101A" as Client of the service X, and "0104" as Message ID, in the conversion table Ta2.

Here, Message ID "0104" is an ID obtained by combining a service ID "01" and a method ID "04". The method ID "04" indicates that the communication data includes a message of, among message types "Req" "Res" "Sub" "Pub" and "Err", the fourth type "Pub" corresponding to the search message.

Also, when receiving communication data (hereinafter, also referred to as "provision data") including a message of providing the service X, the conversion processing unit 21 registers, for example, "P2" as Communication protocol of the provision data, "vehicle-mounted ECU 111B" as Server of the service X, and "02" as Message ID, in the conversion table Ta2.

Here, Message ID "02" indicates that the method ID is "02". The method ID "02" indicates that the communication data includes a message of, among message types "Sub" and "Pub", the second type "Pub" corresponding to the provision message.

Note that FIG. 4 shows, for ease of understanding, a state in which the gateway device 101B that functions as a proxy as will be described later is registered in the conversion table Ta2.

Then, the conversion processing unit 21 performs protocol determination of determining whether or not there is a difference between communication protocols for vehicle-mounted devices that are to communicate with each other, with reference to the conversion table Ta2 registered in the conversion table Ta2. That is to say, the conversion processing unit 21 determines whether or not there is a difference between the communication protocols for search data and provision data of the same service, and performs processing based on the determination result.

When Communication Protocols Match Each Other

If it is determined that the communication protocols for vehicle-mounted devices that are to communicate with each other match each other, the conversion processing unit 21 changes and updates the content of the corresponding rule specified in the relay rule table Ta1 to content that the vehicle-mounted devices are to be permitted to relay communication data in the TCP/IP layer.

FIG. 5 is a diagram showing an example of the relay rule table after the update of the conversion processing unit of the vehicle-mounted relay device according to the embodiment of the present disclosure.

Referring to FIGS. 3 and 5, it is assumed for example that, in contrast to FIG. 4, the communication protocol for the search data for the service X from the gateway device 101A, and the communication protocol for the provision data for the service X from the vehicle-mounted ECU 111B are both the communication protocol P1.

As described above, in the relay rule table Ta1 shown in FIG. 3, before the determination result of the protocol determination by the conversion processing unit 21 is obtained, the rule 12 is registered that the communication data for use in the service X received from the communication port 24A is to be prohibited from being relayed in the TCP/IP layer, and is be output to the conversion processing unit 21.

Also, in the relay rule table Ta1 shown in FIG. 3, before the determination result of the protocol determination by the conversion processing unit 21 is obtained, a rule 32 is registered that the communication data for use in the service X received from the communication port 24C is to be prohibited from being relayed in the TCP/IP layer, and is be output to the conversion processing unit 21.

In this case, as shown in bold underlines in FIG. 5, the conversion processing unit 21 changes the content of the rule 12 to content that the communication data for use in the service X received from the gateway device 101A via the communication port 24A is to be permitted to pass and relay processing be performed, and updates the relay rule table Ta1.

Also, as shown in bold underlines in FIG. 5, the conversion processing unit 21 changes the content of the rule 32 to content that the communication data for use in the service X received from the vehicle-mounted ECU 111B via the communication port 24C is to be permitted to pass and relay processing be performed, and updates the relay rule table Ta1.

Also, it is assumed that the gateway device 101A has multicast search data for the service X conforming to the communication protocol P1 after the update of the relay rule table Ta1. In this case, the relay unit 22 receives the search data via the communication port 24A, and checks the rule to be applied to the search data.

Then, the relay unit 22 determines to permit the passage of the search data and perform relay processing in accordance with the rule 12 in the updated relay rule table Ta1, and performs relay processing for outputting the search data to the communication port 24C. That is, the search data is transmitted to the vehicle-mounted ECU 111B by the relay unit 22, without intervention of the conversion processing unit 21.

Also, it is assumed that the vehicle-mounted ECU 111B has multicast provision data for the service X conforming to the communication protocol P1 after the update of the relay rule table Ta1. In this case, the relay unit 22 receives the provision data via the communication port 24C, and checks the rule to be applied to the provision data.

Then, the relay unit 22 determines to permit the passage of the provision data and perform relay processing in accordance with the rule 32 in the updated relay rule table Ta1, and performs relay processing of outputting the provision data to the communication port 24A. That is, the provision data is transmitted to the gateway device 101A by the relay unit 22, without intervention of the conversion processing unit 21.

When Communication Protocols Are Different From Each Other Notification of Common Protocol If it is determined that the communication protocols for vehicle-mounted devices that are to communicate with each other differ from each other, the conversion processing unit 21 notifies the vehicle-mounted devices of a common protocol, which is a common communication protocol to be used, before communication is started between the vehicle-mounted devices, and suggests using the common protocol.

Referring to FIG. 4 again, more specifically, the communication protocol of the search data for the service X from the gateway device 101A serving as Client is "P1", and the communication protocol of the provision data for the service X from the vehicle-mounted ECU 111B serving as Server is "P2". In this case, the conversion processing unit 21 determines that the communication protocols of the search data and the provision data for the service X are different from each other, and selects the common protocol.

In the example shown in FIG. 4, the conversion table Ta2 specifies that, for the communication data of the message type "Pub" for use in the service X, conversion into both the communication protocols "P1" and "P2" is possible. Accordingly, the conversion processing unit 21 selects, for example, the communication protocol P1 as the common protocol, and notifies the vehicle-mounted ECU 111B of the selected common protocol.

Upon receiving the notification of the common protocol from the gateway device 101B, the vehicle-mounted ECU 111B determines whether or not it is possible to switch to the common protocol, and notifies the gateway device 101B of the determination result. If it is possible to switch to the common protocol, the vehicle-mounted ECU 111B switches to the common protocol, and transmits the provision data in accordance therewith.

The gateway device 101B receives the provision data newly transmitted from the vehicle-mounted ECU 111B in accordance with the common protocol, checks the application rule of the provision data, and performs the above-described protocol determination. At this time, the gateway device 101B determines that the communication protocols of the gateway device 101A and the vehicle-mounted ECU 111B that are to communicate with each other match each other. Then, the operation described in "(a) When Communication Protocols Match Each Other" is performed, and the relay rule table Ta1 is updated as shown in FIG. 5.

On the other hand, if the vehicle-mounted ECU 111B does not intend to use the common protocol, the vehicle-mounted ECU 111B notifies the gateway device 101B of the fact that the vehicle-mounted ECU 111B will not use the common protocol. Upon receiving the notification that the vehicle-mounted ECU 111B will not use the common protocol, the conversion processing unit 21 of the gateway device 101B determines whether or not to perform conversion processing for converting the communication protocol as will be described later.

Note that the conversion processing unit 21 may check the communication protocol that the vehicle-mounted ECU 111 can use, at a timing of authentication processing performed by the gateway device 101B of the vehicle-mounted ECU 111 connected to the gateway device 101B.

Also, the conversion processing unit 21 may not only check the communication protocol that the vehicle-mounted ECU 111 can use at the timing of the authentication processing of the vehicle-mounted ECU 111, but also notify the vehicle-mounted ECU 111 of the common protocol at that timing.

Determination of Whether or Not to Perform Conversion Processing

Upon receiving, from both of the vehicle-mounted devices notified of the common protocol, notifications that they will not use the common protocol, the conversion processing unit 21 determines whether or not to perform conversion processing of the communication protocol for the communication data to be transmitted and received between the vehicle-mounted devices.

More specifically, the conversion processing unit 21 determines whether or not to perform the conversion processing of the communication protocol based on the driving state of the vehicle 1, for example. Specifically, if the vehicle 1 is traveling using automated driving, the conversion processing unit 21 will determine not to perform the conversion processing of the communication protocol in order to prevent an increase in the processing load of the vehicle-mounted communication system 301.

Also, the conversion processing unit 21 may determine whether or not to perform the conversion processing of the communication protocol based on the communication state of the vehicle-mounted communication system 301. Specifically, if the communication volume of the vehicle-mounted communication system 301 per unit of time is equal to or greater than a predetermined threshold, the conversion processing unit 21 determines not to perform the conversion processing of the communication protocol.

Also, the conversion processing unit 21 may determine whether or not to perform the conversion processing of the communication protocol based on a priority added to the type of service provided by the vehicle-mounted communication system 301. Specifically, if the service currently provided by the vehicle-mounted communication system 301 is prioritized relative to the service on which the conversion processing of the communication protocol is to be performed, the conversion processing unit 21 determines not to perform the conversion processing of the communication protocol.

The conversion processing unit 21 determines whether or not to perform the conversion processing of the communication protocol repeatedly on an irregular basis. For example, each time communication data for use in a corresponding service is received from the vehicle-mounted device that is a destination of notification of the common protocol, the conversion processing unit 21 determines whether or not to perform the conversion processing of the communication protocol for the communication data.

Note that the conversion processing unit 21 may determine whether or not to perform the conversion processing of the communication protocol on a regular basis, regardless of whether or not communication data for use in a service has been received. In this case, upon receiving communication data for use in a service, the conversion processing unit 21 adopts the latest determination result.

Also, the conversion processing unit 21 may determine whether or not to perform the conversion processing of the communication protocol using a combination of the above-described determination standards.

If it is determined that conversion processing is to be performed, the conversion processing unit 21 performs the later-described conversion processing. On the other hand, if it is determined that conversion processing is not to be performed, the conversion processing unit 21 performs processing of displaying a notification that it will not perform any conversion processing, and conditions for the conversion processing on a screen, for example.

FIG. 6 is a diagram showing an example of the screen displayed by the conversion processing unit of the vehicle-mounted relay device according to the embodiment of the present disclosure.

Referring to FIG. 6, the conversion processing unit 21 perform processing of displaying, on a not-shown monitor or the like installed in the vehicle 1, messages meaning that the service X corresponding to the conversion processing of the communication protocol is not available and that the service X is available if you switch the driving state of the vehicle 1 from automated driving to manual driving, for example. Then, if, for example, an operation of switching the driving state of the vehicle 1 from automated driving to manual driving is made by a user, the conversion processing unit 21 determines to perform the conversion processing of the communication protocol.

Conversion Processing of Communication Protocol by Conversion Processing Unit

If it is determined that the conversion processing of the communication protocol is to be performed, the conversion processing unit 21 gives a suggestion of conversion processing to be performed by the gateway device 101B to the corresponding vehicle-mounted devices. That is to say, if it is determined that the conversion processing of the communication protocol of the communication data for use in the service X is to be performed, the conversion processing unit 21 inquires the client and the server of the service X as to whether or not it is allowed to perform the conversion processing of the communication protocol.

Then, upon receiving, from both of the client and the server of the service X, notifications that they accept the conversion processing to be performed by the gateway device 101B, the conversion processing unit 21 performs the conversion processing of the communication protocol, for the communication data for use in the service X from the client and the communication data for use in the service X from the server.

More specifically, the conversion processing unit 21 includes a not-shown first proxy and a not-shown second proxy. The first proxy and the second proxy respectively function as a substitution of the client and a substitution of the server.

For example, it is assumed that the gateway device 101A has transmitted search data for the service X conforming to the communication protocol P1. In this case, the second proxy of the conversion processing unit 21 receives the search data via the communication port 24 and the relay unit 22, and performs termination processing on the received search data.

The conversion processing unit 21 converts the search data received by the second proxy into search data conforming to the communication protocol P2. Specifically, the conversion processing unit 21 performs processing such as rewriting the message ID in the header portion of the application layer of the frame in which the search data is stored from "0104" to "02" with reference to the conversion table Ta2 shown in FIG. 4, and converts the communication protocol of the search data from "P1" to "P2". Then, the first proxy outputs the search data conforming to the converted communication protocol P2 to the relay unit 22.

The relay unit 22 transmits the search data for which the conversion processing has been performed by the conversion processing unit 21 to the vehicle-mounted ECU 111B via the communication port 24C.

At this time, the relay unit 22 adds, for example, to the communication data, at least one of information indicating that the conversion processing has been performed, information indicating the communication protocol used prior to the conversion processing, and information indicating conditions for stopping the conversion processing, and relays the resultant communication data. Examples of the conditions for stopping the conversion processing include the driving state of the vehicle 1 being switched from manual driving to automated driving, and the communication volume of the vehicle-mounted communication system 301 per unit of time being equal to or greater than the predetermined threshold.

Upon receiving the converted search data transmitted from the gateway device 101B, the vehicle-mounted ECU 111B performs, based on the information that is included in the search data and indicates that the conversion processing of the communication protocol has been performed for example, processing that takes into consideration the impact of the conversion processing, such as setting an elongated delay permission time for the communication data.

Also, for example, based on information that is included in the search data and indicates the communication protocol used prior to the conversion processing, the vehicle-mounted ECU 111B may perform communication that takes into consideration a difference in communication protocol, such as communication in which the use of the communication protocol before conversion is suppressed. Also, based on the information that is included in the search data and indicates the conditions for stopping the conversion processing, the vehicle-mounted ECU 111B may implement a countermeasure that corresponds to the content of the condition, such as suppressing an increase in the communication volume of the vehicle-mounted ECU 111B.

Also, it is assumed for example that the vehicle-mounted ECU 111B has transmitted provision data for the service X conforming to the communication protocol P2. In this case, the first proxy of the conversion processing unit 21 receives the provision data via the communication port 24 and the relay unit 22, and performs termination processing on the received provision data.

The conversion processing unit 21 converts the provision data received by the first proxy into provision data conforming to the communication protocol P1. Specifically, the conversion processing unit 21 performs processing such as rewriting the message ID in the header portion of the application layer of the frame in which the search data is stored from "02" to "0104" with reference to the conversion table Ta2 shown in FIG. 4, and converts the communication protocol of the search data from "P2" to "P1". Then, the second proxy outputs the provision data conforming to the converted communication protocol P1 to the relay unit 22.

The relay unit 22 transmits the provision data for which the conversion processing has been performed by the conversion processing unit 21 to the gateway device 101A via the communication port 24A. With this, communication connection between the server and the client of the service X is established in the vehicle-mounted communication system 301, and the service X is made available.

The devices in the vehicle-mounted communication system according to an embodiment of the present disclosure each have a computer that includes a memory, and in each of such devices, an arithmetic conversion processing unit such as a CPU in the computer reads out, from the memory, a program that includes part or all of the steps of the sequence or flowchart described below, and executes the program. The programs executed by the devices can be installed from an external source. The programs executed by the devices are distributed in a state of being stored in recording media or distributed via a communication line.

Figure 7:
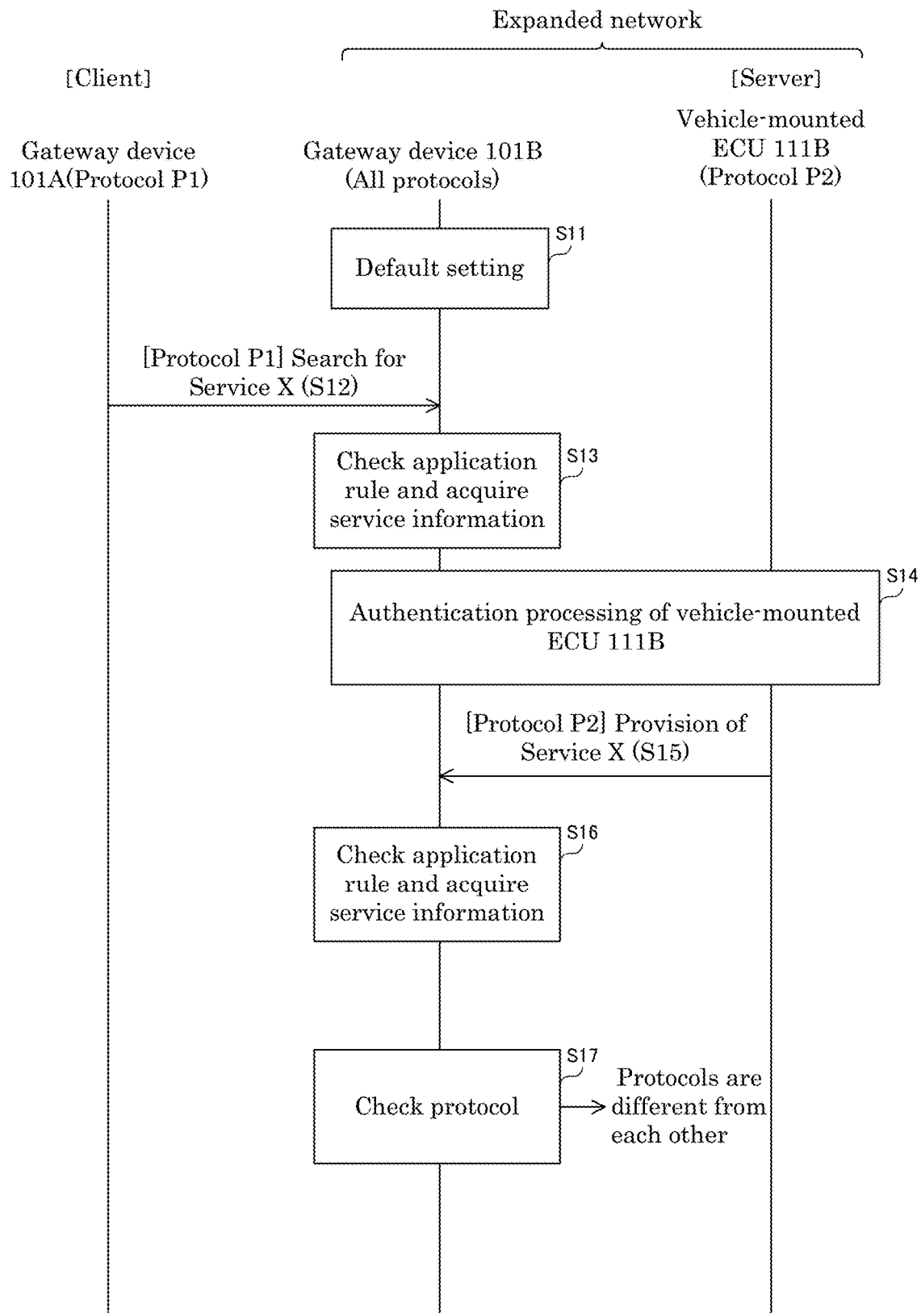
FIG. 7 shows a sequence that defines operation procedures of devices of the vehicle-mounted communication system according to the embodiment of the present disclosure, until an expanded gateway device suggests performing conversion processing of a communication protocol.
Figure 8:
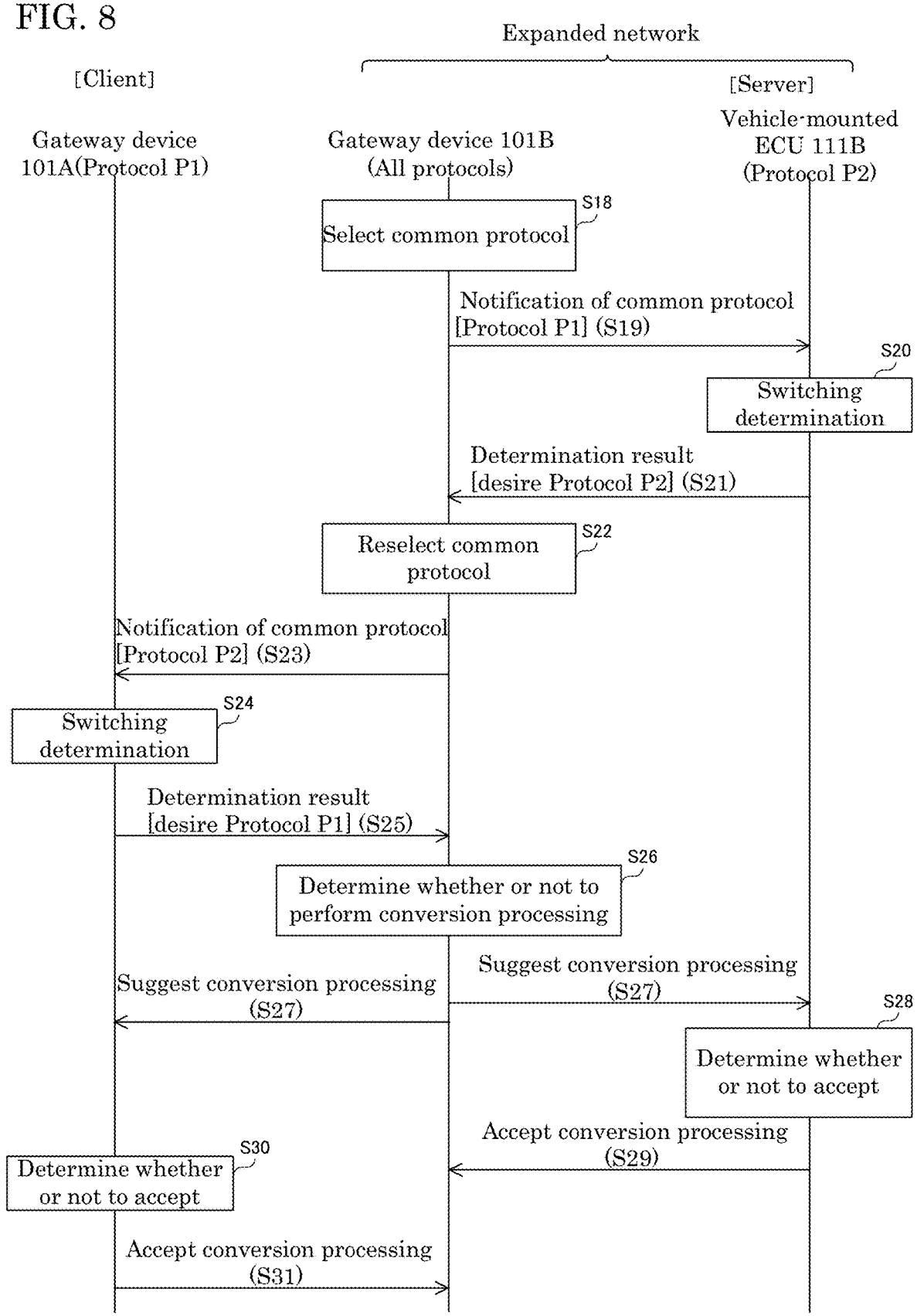
FIG. 8 shows a sequence that defines operation procedures of devices of the vehicle-mounted communication system according to the embodiment of the present disclosure, until an expanded gateway device suggests performing conversion processing of a communication protocol.

Realization of Service Using Global Communication
Operation Up to Suggest Performing Conversion Processing of Communication Protocol FIGS. 7 and 8 show a sequence that defines operation procedures of devices of the vehicle-mounted communication system according to the embodiment of the present disclosure, until an expanded gateway device suggests performing conversion processing of a communication protocol. FIG. 8 shows a sequence of the operation that follows the operation shown in FIG. 7.

Referring to FIGS. 7 and 8, first, when the gateway device 101B is newly connected to an existing network for example, the gateway device 101B configures its own default settings so as to perform control in accordance with the rule specified in the relay rule table Ta1 shown in FIG. 3 (step S11).

Then, it is assumed that the gateway device 101A multicasts search data for the service X conforming to the communication protocol P1 (step S12).

Then, upon receiving the search data transmitted from the gateway device 101A, the gateway device 101B checks, among the rules defined in the relay rule table Ta1, the rule to be applied to the search data, and performs processing in accordance with the checked rule. It is assumed here that the gateway device 101B interrupts relay processing of relaying the search data in accordance with the rule specified in the relay rule table Ta1.

In this case, the gateway device 101B acquires various types of service information on the service X corresponding to the search data, and registers the acquired various types of service information in the conversion table Ta2 (step S13).

Then, when the vehicle-mounted ECU 111B is newly connected for example, the gateway device 101B performs authentication processing of authenticating the vehicle-mounted ECU 111B (step S14).

Then, it is assumed that after the authentication processing of the gateway device 101B has been successfully completed, the vehicle-mounted ECU 111B multicasts provision data for the service X conforming to the communication protocol P2 (step S15).

Then, upon receiving the provision data transmitted from the vehicle-mounted ECU 111B, the gateway device 101B checks, among the rules defined in the relay rule table Ta1, the rule to be applied to the provision data, and performs processing in accordance with the checked rule. It is assumed here that the gateway device 101B interrupts relay processing of relaying the provision data in accordance with the rule specified in the relay rule table Ta1.

In this case, the gateway device 101B acquires various types of service information on the service X corresponding to the provision data, and registers the acquired various types of service information in the conversion table Ta2 (step S16).

Then, the gateway device 101B checks whether or not there is a difference between the communication protocol of the search data corresponding to the service X, and the communication protocol of the provision data, with reference to the service information registered in the conversion table Ta2. Here, the communication protocol of the search data is "P1" and the communication protocol of the provision data is "P2". Accordingly, the gateway device 101B determines that the communication protocols are different (step S17).

Then, the gateway device 101B selects, for example, the communication protocol P1 as the common protocol with reference to the conversion table Ta2 (step S18), and notifies the vehicle-mounted ECU 111B of the selected common protocol, thereby suggesting using the common protocol (step S19).

Then, upon receiving a notification of the common protocol from the gateway device 101B, the vehicle-mounted ECU 111B determines whether or not it is possible to switch to communication conforming to the common protocol (step S20), and notifies the gateway device 101B of the determination result (step S21). Here, it is assumed that switching to the communication protocol P1 is determined to be impossible, and the vehicle-mounted ECU 111B desires to perform communication in accordance with the communication protocol P2, and notifies the gateway device 101B of the determination result that the vehicle-mounted ECU 111B will not use the common protocol.

Then, upon receiving, from the vehicle-mounted ECU 111B, the determination result that it will not use the common protocol, the gateway device 101B reselects, for example, the communication protocol P2 as the common protocol with reference to the conversion table Ta2 (step S22), and notifies the gateway device 101A of the reselected common protocol, thereby suggesting using the common protocol (step S23).

Then, upon receiving the notification of the common protocol from the gateway device 101B, the gateway device 101A determines whether or not it is possible to switch to communication in accordance with the common protocol (step S24), and notifies the gateway device 101B of the determination result (step S25). Here, it is assumed that the switching to the communication protocol P2 is determined to be impossible, and the gateway device 101A desires to perform communication in accordance with the communication protocol P1, and notifies the gateway device 101B of the determination result that the gateway device 101A will not use the common protocol.

Then, upon receiving from the gateway device 101A the determination result that it will not use the common protocol, the gateway device 101B determines whether or not to perform conversion processing of the communication protocol for the communication data to be transmitted and received between the gateway device 101A and the vehicle-mounted ECU 111B. For example, the gateway device 101B determines, based on the driving state of the vehicle 1 or the like, whether or not to perform the conversion processing (step S26).

Then, if it is determined to perform the conversion processing, the gateway device 101B gives a suggestion of conversion processing to be performed by the gateway device 101B to the gateway device 101A and the vehicle-mounted ECU 111B. At this time, the gateway device 101B notifies the gateway device 101A and the vehicle-mounted ECU 111B of, together with the suggestion of the conversion processing, information to be converted by the conversion processing, restrictions such as processing delay due to the execution of the conversion processing, and the like, for example (step S27).

Then, the vehicle-mounted ECU 111B determines whether or not to accept the conversion processing to be performed by the gateway device 101B. For example, the vehicle-mounted ECU 111B determines whether or not to accept the conversion processing based on the extent of the impact when a delay in communication data occurs due to the execution of the conversion processing, for example (step S28).

Then, if it is determined to accept the conversion processing to be performed by the gateway device 101B, the vehicle-mounted ECU 111B notifies the gateway device 101B of the acceptance of the conversion processing (step S29).

Then, similar to the vehicle-mounted ECU 111B, the gateway device 101A determines whether or not to accept the conversion processing to be performed by the gateway device 101B (step S30), and if it is determined to accept the conversion processing, the gateway device 101A notifies the gateway device 101B of the acceptance of the conversion processing (step S31).

Execution of Conversion Processing

Figure 9:
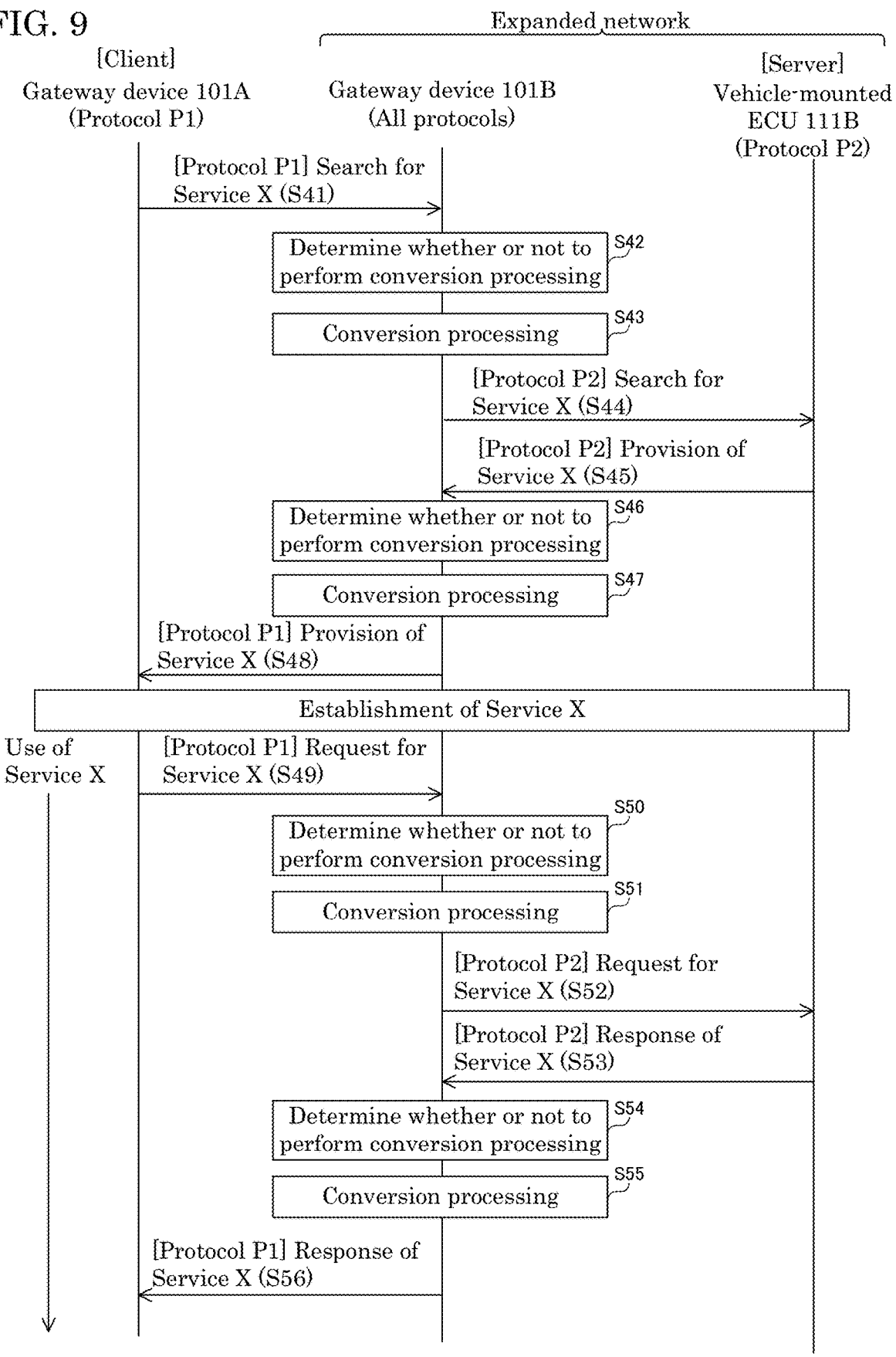
FIG. 9 shows a sequence that defines operation procedures of the devices of the vehicle-mounted communication system according to the embodiment of the present disclosure, when the expanded gateway device executes conversion processing of a communication protocol.

FIG. 9 shows a sequence that defines operation procedures of the devices of the vehicle-mounted communication system according to the embodiment of the present disclosure, when the expanded gateway device executes conversion processing of a communication protocol. FIG. 9 shows a sequence of the operation that follows the operation shown in FIG. 8.

Referring to FIG. 9, first, it is assumed that the gateway device 101A multicasts the search data for the service X, continuously using the communication protocol P1 (step S41).

Then, when the gateway device 101B receives the search data transmitted from the gateway device 101A, the second proxy of the gateway device 101B performs termination processing on the search data. Then, the gateway device 101B determines whether or not to perform the suggested conversion processing of the communication protocol based on the driving state of the vehicle 1 or the like. It is assumed here that the gateway device 101B determines to perform the conversion processing (step S42).

Then, the gateway device 101B performs conversion processing of converting the communication protocol P1 of the received search data into the communication protocol P2 (step S43).

Then, the first proxy of the gateway device 101B transmits the search data conforming to the converted communication protocol P2 to the vehicle-mounted ECU 111B (step S44).

Then, it is assumed that the vehicle-mounted ECU 111B multicasts the provision data for the service X, continuously using the communication protocol P2 (step S45).

Then, when the gateway device 101B receives the provision data transmitted from the vehicle-mounted ECU 111B, the first proxy of the gateway device 101B performs termination processing on the provision data. Then, the gateway device 101B determines whether or not to perform the suggested conversion processing of the communication protocol, based on the driving state of the vehicle 1 or the like. It is assumed here that the gateway device 101B determines to perform the conversion processing (step S46).

Then, the gateway device 101B performs conversion processing of converting the communication protocol P2 of the received provision data into the communication protocol P1 (step S47).

Then, the second proxy of the gateway device 101B transmits the provision data conforming to the converted communication protocol P1 to the gateway device 101A (step S48). With this, communication connection between the server and the client of the service X is established in the vehicle-mounted communication system 301.

Then, it is assumed that the gateway device 101A transmits communication data (hereinafter, also referred to as "request data") including a message of requesting the service X to the vehicle-mounted ECU 111B, continuously using the communication protocol P1 (step S49).

Then, when the gateway device 101B receives the request data transmitted from the gateway device 101A, the second proxy of the gateway device 101B performs termination processing on the request data. Then, the gateway device 101B determines whether or not to perform conversion processing of the communication protocol based on the driving state of the vehicle 1 or the like. It is assumed here that the gateway device 101B determines to perform the conversion processing (step S50).

Then, the gateway device 101B performs conversion processing of converting the communication protocol P1 of the received request data into the communication protocol P2 (step S51).

Then, the first proxy of the gateway device 101B transmits the request data conforming to the converted communication protocol P2 to the vehicle-mounted ECU 111B (step S52).

Then, it is assumed that the vehicle-mounted ECU 111B transmits communication data (hereinafter, also referred to as "response data") including a response message of responding to the request data for the service X to the gateway device 101A (step S53), continuously using the communication protocol P2.

Then, when the gateway device 101B receives the response data transmitted from the vehicle-mounted ECU 111B, the first proxy of the gateway device 101B performs termination processing on the response data. Then, the gateway device 101B determines whether or not to perform conversion processing of the communication protocol based on the driving state of the vehicle 1 or the like. It is assumed here that the gateway device 101B determines to perform the conversion processing (step S54).

Then, the gateway device 101B performs conversion processing of converting the communication protocol P2 of the received response data into the communication protocol P1 (step S55).

Then, the second proxy of the gateway device 101B transmits the response data conforming to the converted communication protocol P1 to the gateway device 101A (step S56). As a result of the operations in, for example, steps S49 to S56 being repeated in this manner, the service X is realized in the vehicle-mounted communication system 301.

When Communication Protocols Match Each Other

Figure 10:
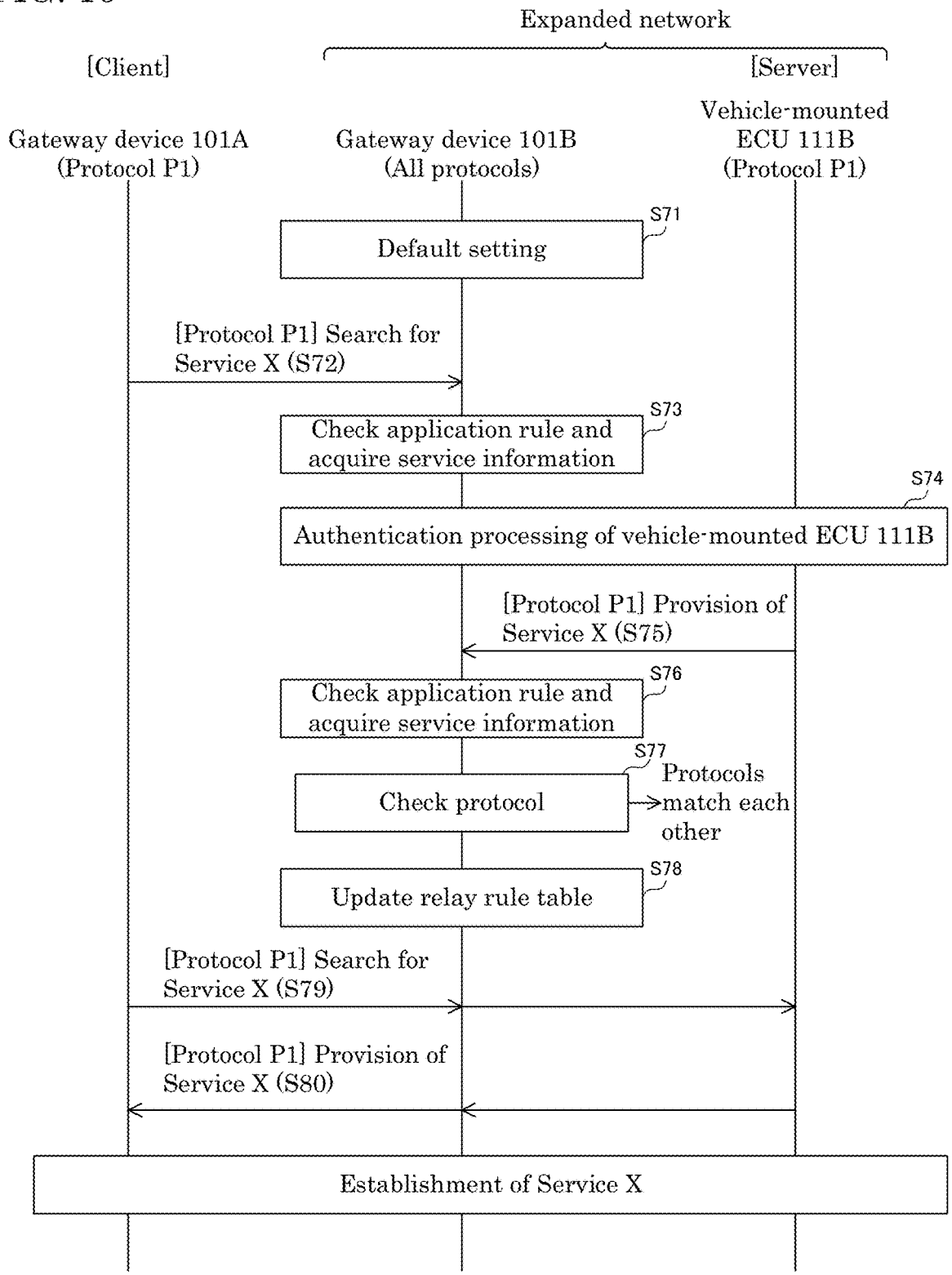
FIG. 10 shows a sequence that defines operation procedures of the devices of the vehicle-mounted communication system according to the embodiment of the present disclosure, until a service is established when communication protocols of a server and a client of the service match each other.

FIG. 10 shows a sequence that defines operation procedures of the devices of the vehicle-mounted communication system according to the embodiment of the present disclosure, until a service is established when communication protocols of a server and a client of the service match each other. In contrast to the cases shown in FIGS. 7 to 9, it is assumed here that the vehicle-mounted ECU 111B is a device that performs communication in accordance with the communication protocol P1.

Referring to FIG. 10, operations of step S71 to S74 are the same as the operations in steps S11 to S14 shown in FIG. 7, and thus detailed descriptions for them will not be repeated here.

Then, it is assumed that after the authentication processing of the gateway device 101B has been successfully completed, the vehicle-mounted ECU 111B multicasts provision data for the service X conforming to the communication protocol P1 (step S75).

Then, upon receiving the provision data transmitted from the vehicle-mounted ECU 111B, the gateway device 101B checks, among the rules defined in the relay rule table Ta1, the rule to be applied to the provision data, and performs processing in accordance with the checked rule. It is assumed here that the gateway device 101B interrupts relay processing of relaying the provision data in accordance with the rule specified in the relay rule table Ta1.

In this case, the gateway device 101B acquires various types of service information on the service X corresponding to the provision data, and registers the acquired various types of service information in the conversion table Ta2 (step S76).

Then, the gateway device 101B checks whether or not there is a difference between the communication protocol of the search data corresponding to the service X, and the communication protocol of the provision data, with reference to the service information registered in the conversion table Ta2. Here, the communication protocol of the search data and the communication protocol of the provision data are both "P1". Accordingly, the gateway device 101B determines that the communication protocols match each other (step S77).

Then, the gateway device 101B changes and update content of, among the rules registered in the relay rule table Ta1, the rule regarding the search data of the service X from the gateway device 101A, and the rule regarding the provision data of the service X from the vehicle-mounted ECU 111B.

Specifically, the gateway device 101B changes and updates control content specified by the rules corresponding to the search data and the provision data, among the rules registered in the relay rule table Ta1, from a state in which the relay processing is prohibited to a state in which relay processing is permitted (step S78).

Then, it is assumed that the gateway device 101A multicasts again the search data for the service X in accordance with the communication protocol P1. In this case, the gateway device 101B permits passage of the search data and relays the search data to the vehicle-mounted ECU 111B, in accordance with the rule registered in the updated relay rule table Ta1 (step S79).

Then, it is assumed that the vehicle-mounted ECU 111B multicasts again the provision data for the service X in accordance with the communication protocol P1. In this case, the gateway device 101B permits passage of the provision data and relays the provision data to the gateway device 101A, in accordance with the rule registered in the updated relay rule table Ta1 (step S80). With this, communication connection between the server and the client of the service X is established in the vehicle-mounted communication system 301.

Modification

The above-described example has described how to realize the service X using global communication between a vehicle-mounted device belonging to an existing network and a vehicle-mounted device belonging to an expanded network. In contrast, a modification will describe how to realize the service Y using local communication between a plurality of vehicle-mounted devices belonging to an expanded network.

Configuration of Vehicle-Mounted Communication System

Figure 11:
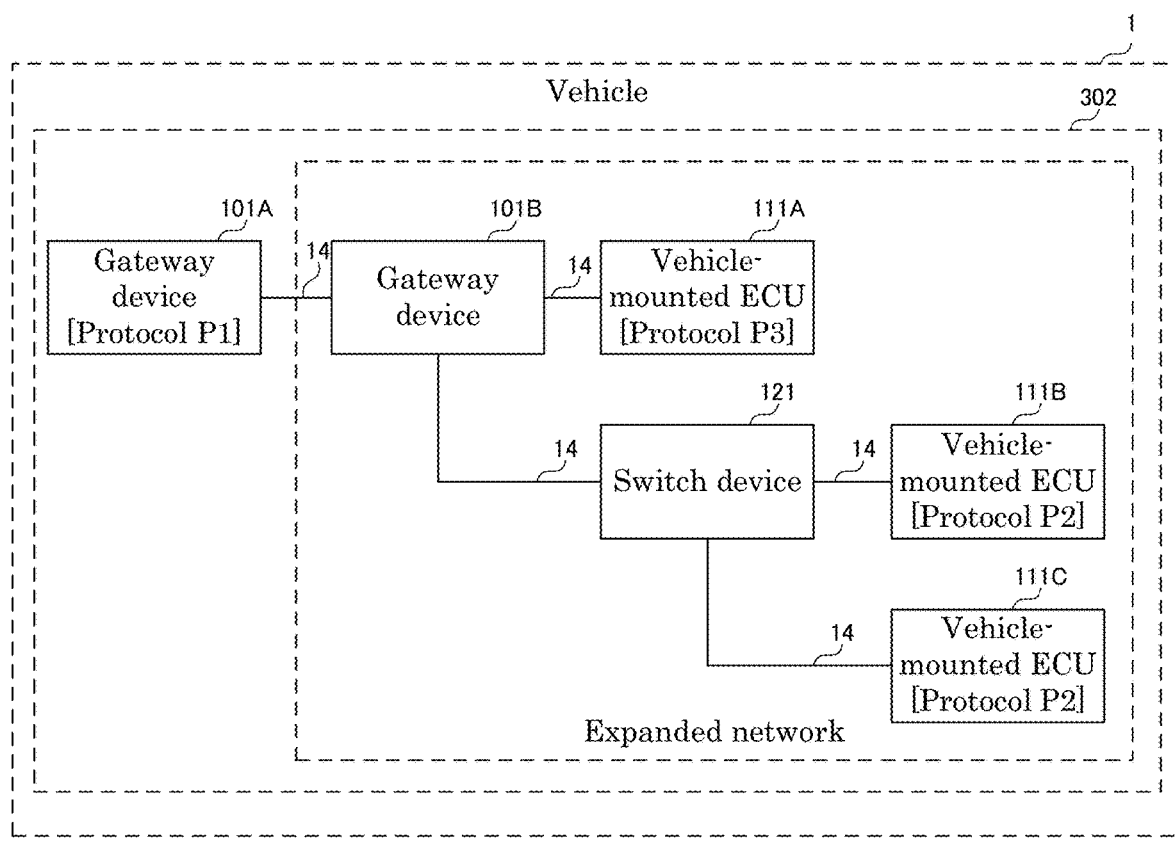
FIG. 11 is a diagram showing a configuration of a vehicle-mounted communication system according to the modification of the embodiment of the present disclosure.

FIG. 11 is a diagram showing a configuration of a vehicle-mounted communication system according to the modification of the embodiment of the present disclosure.

Referring to FIG. 11, a vehicle-mounted communication system 302 according to the modification includes a switch device 121 and a vehicle-mounted ECU 111C, in addition to the gateway device 101A, the gateway device 101B, the vehicle-mounted ECU 111A, and the vehicle-mounted ECU 111B shown in FIG. 1. The vehicle-mounted communication system 302 is mounted in the vehicle 1.

More specifically, it is assumed that the gateway device 101B is newly connected to the existing gateway device 101A, the vehicle-mounted ECU 111A and the switch device 121 are connected to the gateway device 101B, and the vehicle-mounted ECUs 111B and 111C are connected to the switch device 121. A network including the gateway device 101B, the switch device 121, and the vehicle-mounted ECUs 111A, 111B, and 111C is hereinafter also referred to as an "expanded network".

It is assumed here that a client of the service Y realized by local communication in the expanded network is the vehicle-mounted ECU 111A that performs communication in accordance with the communication protocol P3. Also, it is assumed that a server of the service Y is the vehicle-mounted ECU 111B that performs communication in accordance with the communication protocol P2.

Realization of Service Using Local Communication

Operation Until Conversion Processing of Communication Protocol is Suggested

Figure 12:
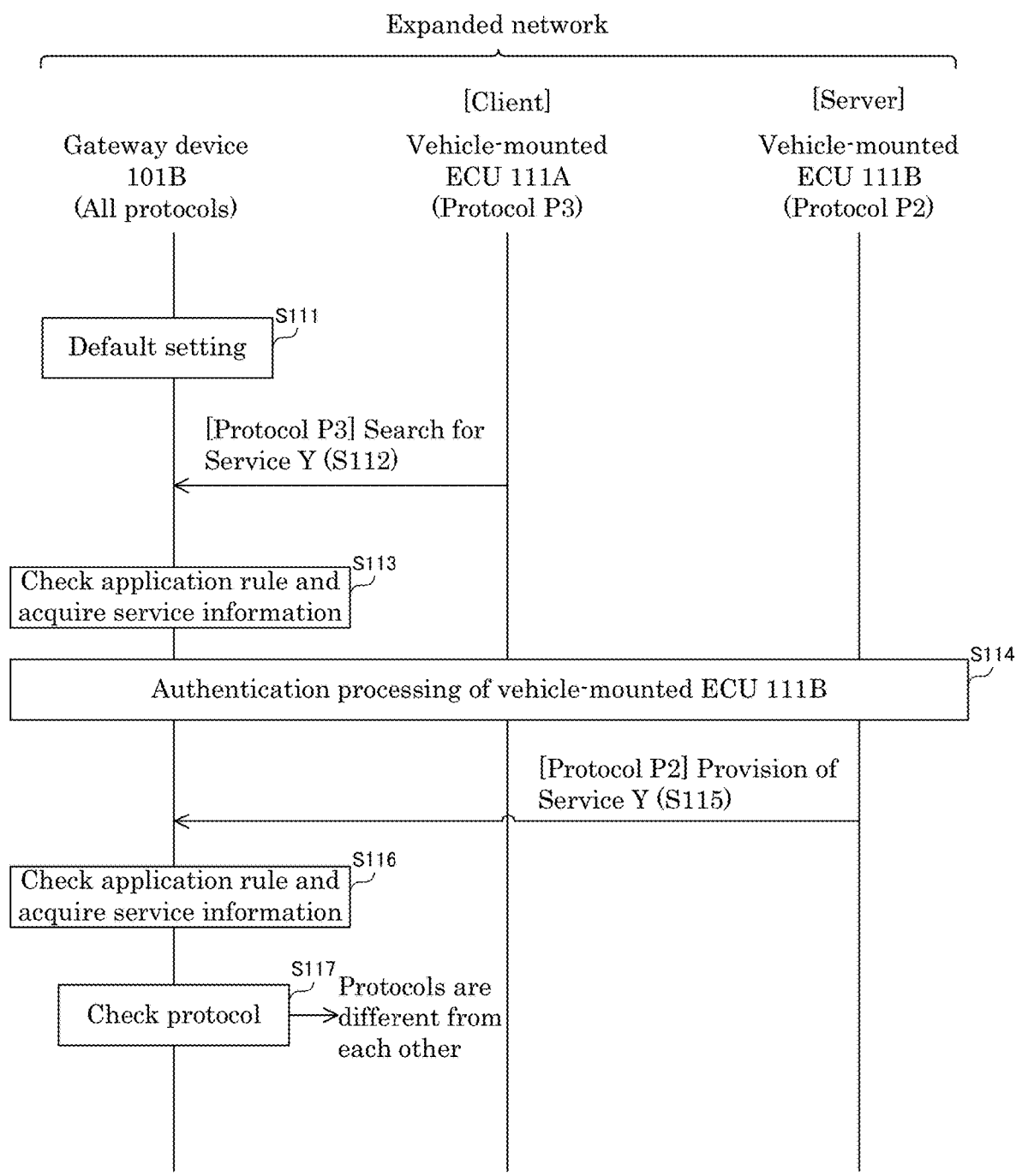
FIG. 12 shows a sequence that defines operation procedures of devices of the vehicle-mounted communication system according to the modification of the embodiment of the present disclosure, until the expanded gateway device suggests conversion processing of the communication protocol.
Figure 13:
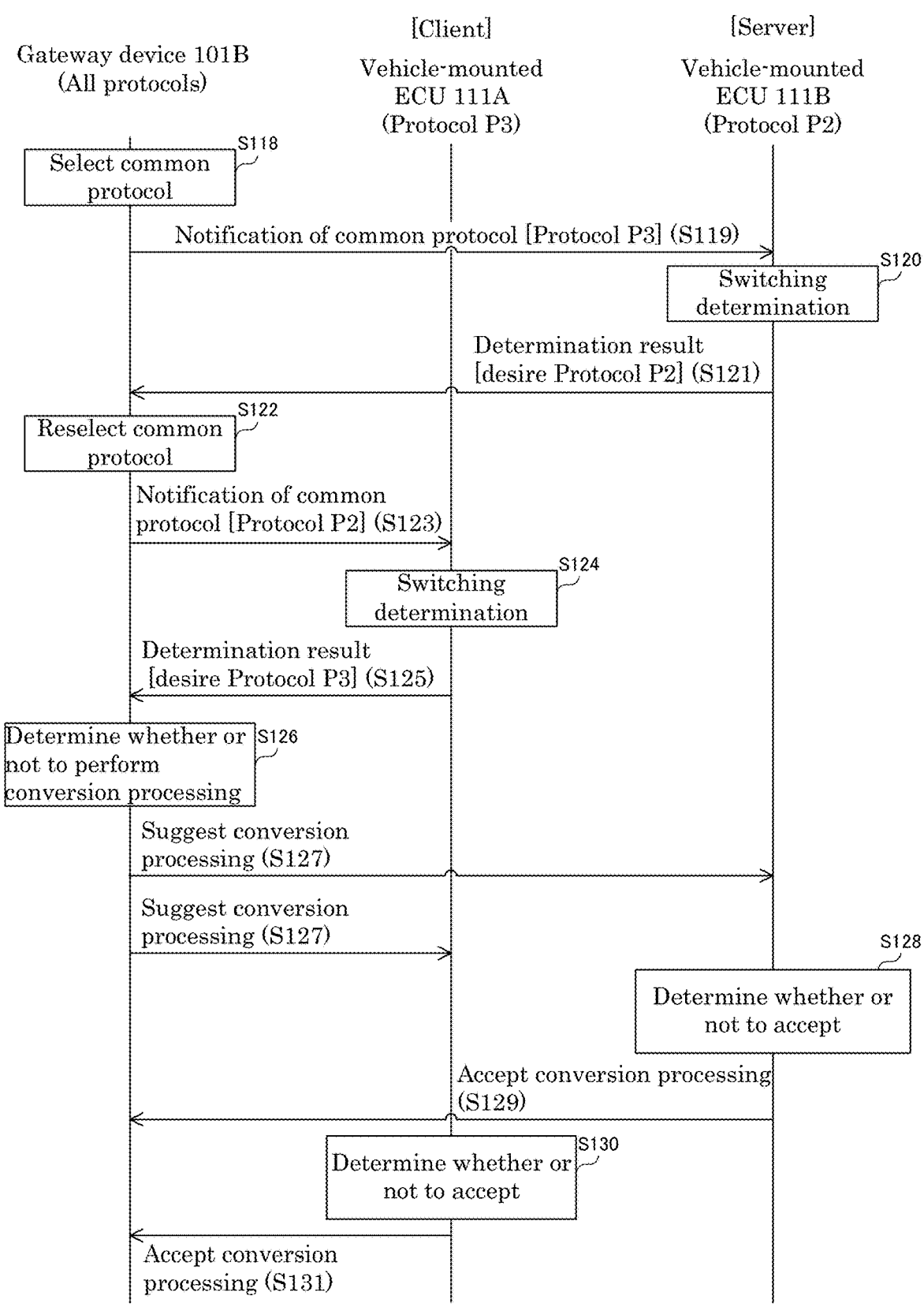
FIG. 13 shows a sequence that defines operation procedures of devices of the vehicle-mounted communication system according to the modification of the embodiment of the present disclosure, until the expanded gateway device suggests conversion processing of the communication protocol.

FIGS. 12 and 13 show a sequence that defines operation procedures of devices of the vehicle-mounted communication system according to the modification of the embodiment of the present disclosure, until the expanded gateway device suggests conversion processing of the communication protocol. FIG. 13 shows a sequence of the operation that follows the operation shown in FIG. 12.

Referring to FIGS. 12 and 13, operations in steps S111 to S131 are such that in the description of the operations in steps S11 to S31 shown in FIGS. 7 and 8, the gateway device 101A and the vehicle-mounted ECU 111A are replaced with each other, the service X and the service Y are replaced with each other, and the communication protocol P1 and the communication protocol P3 are replaced with each other, and thus detailed description thereof will not be repeated here.

Execution of Conversion Processing

Figure 14:
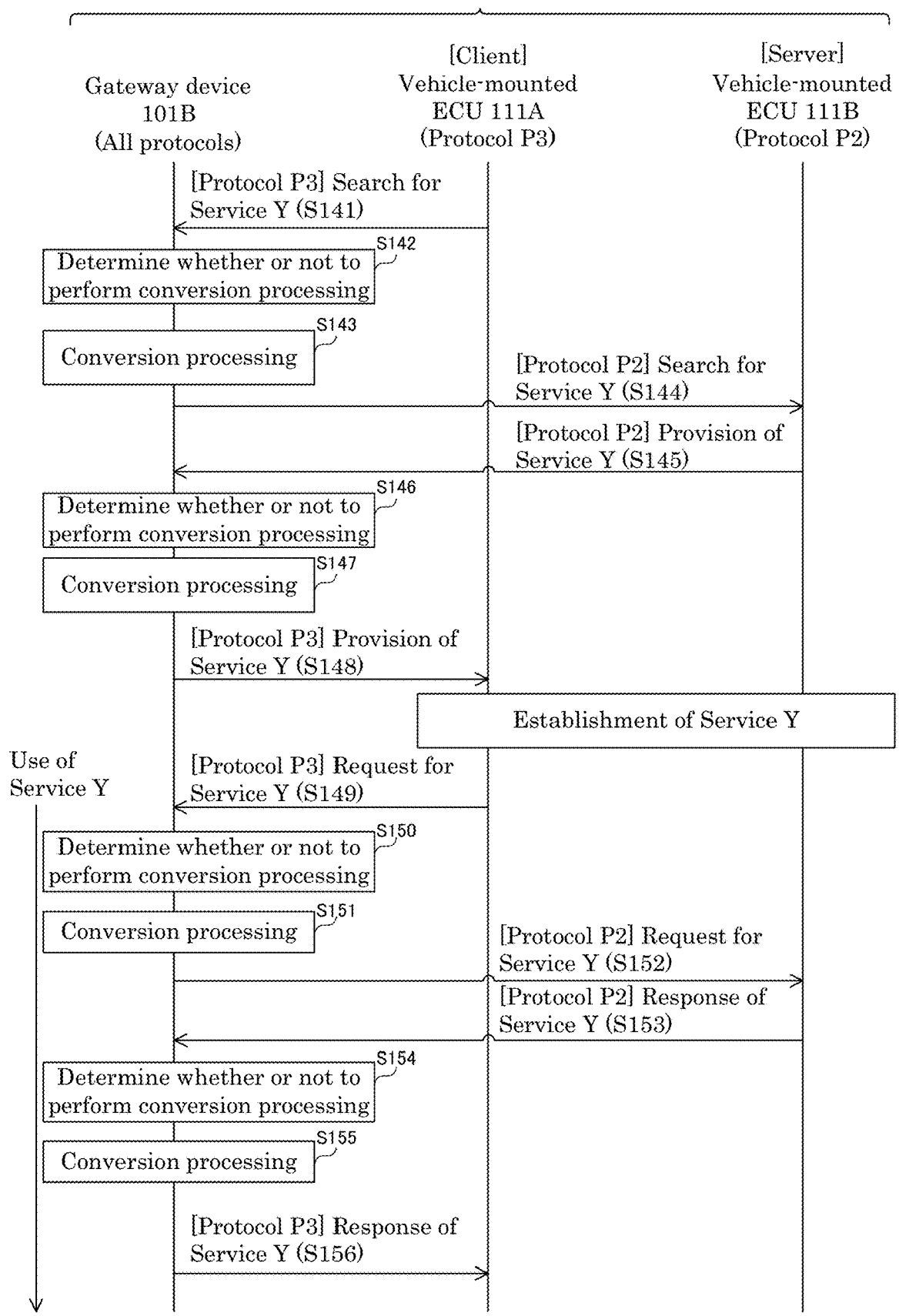
FIG. 14 shows a sequence that defines operation procedures of the devices of the vehicle-mounted communication system according to the modification of the embodiment of the present disclosure, when the expanded gateway device executes conversion processing of a communication protocol.

FIG. 14 shows a sequence that defines operation procedures of the devices of the vehicle-mounted communication system according to the modification of the embodiment of the present disclosure, when the expanded gateway device executes conversion processing of a communication protocol. FIG. 14 shows a sequence of the operation that follows the operation shown in FIG. 13.

Referring to FIG. 14, the operations in steps S141 to S156 are such that in the description of the operations in steps S41 to S56 shown in FIG. 9, the gateway device 101A and the vehicle-mounted ECU 111A are replaced with each other, the service X and the service Y are replaced with each other, and the communication protocol P1 and the communication protocol P3 are replaced with each other, and thus detailed description thereof will not be repeated here.

When Communication Protocols Match Each Other

Figure 15:
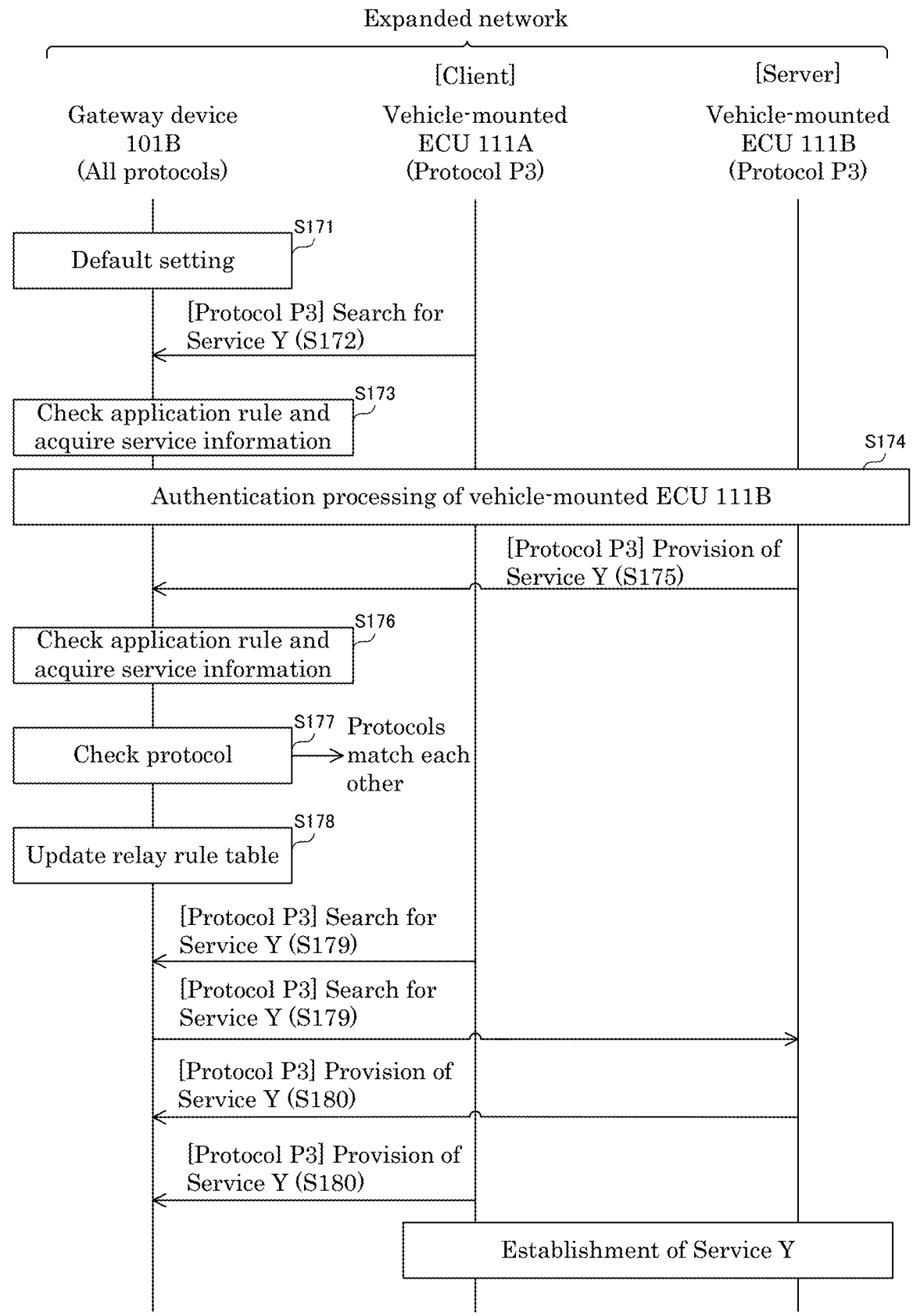
FIG. 15 shows a sequence that defines operation procedures of the devices of the vehicle-mounted communication system according to the modification of the embodiment of the present disclosure, until a service is established when communication protocols of a server and a client of the service match each other.

FIG. 15 shows a sequence that defines operation procedures of the devices of the vehicle-mounted communication system according to the modification of the embodiment of the present disclosure, until a service is established when communication protocols of a server and a client of the service match each other. In contrast to the case shown in FIGS. 12 to 14, it is assumed here that the vehicle-mounted ECU 111B is a device that performs communication in accordance with the communication protocol P3.

Referring to FIG. 15, operations in steps S171 to S180 are such that in the description of the operations in steps S71 to S80 shown in FIG. 10, the gateway device 101A and the vehicle-mounted ECU 111A are replaced with each other, the service X and the service Y are replaced with each other, and the communication protocol P1 and the communication protocol P3 are replaced with each other, and thus detailed description thereof will not be repeated here.

By the way, if communication protocols used by vehicle-mounted devices are different from each other, communication data cannot be transmitted and received between these vehicle-mounted devices.

The above-described vehicle control device disclosed in JP 2009-161103A does not mention a method that deals with a case where communication protocols of vehicle-mounted devices are different from each other. Also, in the conversion unit disclosed in JP 2009-27245A, a gateway processing unit performs protocol conversion for all communications between an existing network and an added network, thus resulting in problems including an increase in the processing load of the gateway processing unit and an increase in the communication volume between the networks.

In contrast, with the vehicle-mounted relay device, vehicle-mounted communication system, and communication control method according to the embodiment of the present disclosure, when the communication protocols of the vehicle-mounted devices are different from each other, it is possible to perform communication between the vehicle-mounted devices while suppressing the processing load and communication load with the configuration and method described above.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the features described in the following supplementary note.

Supplementary Note 1

A vehicle-mounted relay device in a vehicle-mounted communication system provided with a plurality of vehicle-mounted devices, includes a relay unit configured to relay communication data between the plurality of vehicle-mounted devices; and a processing unit configured to notify, before communication is started between the vehicle-mounted devices, the vehicle-mounted devices of a common protocol that is a common communication protocol to be used, wherein, in authentication processing of the vehicle-mounted devices, the processing unit checks a communication protocol in a layer above the TCP/IP that the vehicle-mounted devices can use, and notifies the vehicle-mounted devices of the common protocol that is different from the checked communication protocol.

Supplementary Note 2

A vehicle-mounted communication system includes a plurality of vehicle-mounted devices including a vehicle-mounted relay device, wherein the vehicle-mounted relay device is configured to relay communication data between the plurality of vehicle-mounted devices. The vehicle-mounted relay device is configured to notify, before communication is started between the vehicle-mounted devices, each of the vehicle-mounted devices of a common protocol that is a common communication protocol to be used. Upon receiving a notification of the common protocol, the vehicle-mounted device determines whether or not to switch to communication using the common protocol. When notifying the vehicle-mounted relay device of a determination result that the vehicle-mounted device has determined not to use the common protocol, the vehicle-mounted device determines, in response to a suggestion of conversion processing of the communication protocol given by the vehicle-mounted relay device, whether or not to accept the conversion processing. At least one of the vehicle-mounted devices, and the vehicle-mounted relay device are included in an expanded network newly added to an existing network, and one of the vehicle-mounted devices serves as a client of a service, another one of the vehicle-mounted devices serves as a server of the service, and the service is available if communication connection between the vehicle-mounted devices is established.

The invention claimed is:

1. A vehicle-mounted relay device in a vehicle-mounted communication system provided with a plurality of vehicle-mounted devices, the vehicle-mounted relay device comprising:
 a relay unit configured to relay communication data between the plurality of vehicle-mounted devices, each of the plurality of vehicle-mounted devices communicating use at least one communication protocol selected from a list of communication protocols consisting of: (1) a SOME/IP (Scalable service-Oriented MiddlewarE over/Internet Protocol); (2) an MQTT (Message Queueing Telemetry Transport); (3) an OPC UA (OPC Unified Architecture); and (4) a CoAP (Constrained Application Protocol); and
 a processing unit configured to, before any communication is relayed between the vehicle-mounted devices by the relay unit, process each of the plurality of vehicle-mounted devices to determine a common protocol that is a communication protocol among the at least one communication protocol used by each of the plurality of vehicle-mounted devices, and wherein the processing unit notifies each of the plurality of vehicle-mounted devices of the common protocol to be used for communication.

2. The vehicle-mounted relay device according to claim 1, wherein, if the processing unit receives, from all of the vehicle-mounted devices notified of the common protocol, notifications that the vehicle-mounted devices have determined not to use the common protocol, the processing unit determines whether or not to perform conversion processing of a communication protocol for communication data to be transmitted and received between the vehicle-mounted devices.

3. The vehicle-mounted relay device according to claim 2, wherein the processing unit determines whether or not to perform the conversion processing, based on a driving state of a vehicle in which the vehicle-mounted communication system is mounted.

4. The vehicle-mounted relay device according to claim 2, wherein the processing unit determines whether or not to perform the conversion processing, based on a communication state of the vehicle-mounted communication system.

5. The vehicle-mounted relay device according to claim 2, wherein the processing unit determines whether or not to perform the conversion processing on a regular basis or on an irregular basis.

6. The vehicle-mounted relay device according to claim 2, wherein, when the conversion processing has been performed by the processing unit, the relay unit adds, to communication data for which the conversion processing has been performed, information indicating that the communication protocol has been converted, and relays the communication data.

7. The vehicle-mounted relay device according to claim 2, wherein, when the conversion processing has been performed by the processing unit, the relay unit adds, to communication data for which the conversion processing has been performed, information indicating a communication protocol used prior to the conversion processing, and relays the communication data.

8. The vehicle-mounted relay device according to claim 2, wherein, when the conversion processing has been performed by the processing unit, the relay unit adds, to communication data for which the conversion processing has been performed, information indicating a condition for stopping the conversion processing, and relays the communication data.

9. The vehicle-mounted relay device according to claim 2, wherein, if the processing unit determines not to perform the conversion processing, the processing unit performs processing for displaying a notification that the conversion processing is not to be performed, and a condition for performing the conversion processing on a screen.

10. The vehicle-mounted relay device according to claim 1, further including,
a storage unit storing relay permission information relating to relaying of communication data in a TCP/IP (Transmission Control Protocol/Internet Protocol) layer,
wherein the processing unit performs protocol determination of determining whether or not there is a difference in communication protocol between the vehicle-mounted devices,
the relay permission information indicates that the relaying of the communication data between the vehicle-mounted devices in the TCP/IP layer is prohibited before a determination result of the protocol determination performed by the processing unit is obtained, and
if, in the protocol determination, it is determined that the communication protocols of the vehicle-mounted devices match each other, the processing unit changes content of the relay permission information to content that the relaying of the communication data between the vehicle-mounted devices in the TCP/IP layer is to be permitted, and if it is determined that the communication protocols of the vehicle-mounted devices are different from each other, the processing unit notifies the vehicle-mounted devices of the common protocol.

11. The vehicle-mounted relay device according to claim 1, further including a storage unit storing conversion information that indicates a list of types of convertible communication protocols for use in a service provided by the vehicle-mounted communication system.

12. The vehicle-mounted relay device according to claim 11, wherein the conversion information indicates a list of types of communication protocols associated with each service.

13. The vehicle-mounted relay device according to claim 12, wherein a plurality of services provided by the vehicle-mounted communication system include at least one of a service realized between the vehicle-mounted devices belonging to different networks, and a service realized between the vehicle-mounted devices belonging to the same network.

14. A vehicle-mounted communication system comprising:
a plurality of vehicle-mounted devices including a vehicle-mounted relay device, each of the plurality of vehicle-mounted devices communicating using at least one communication protocol, the at least one communication protocol selected from a list of communication protocols consisting of: (1) a SOME/IP (Scalable service-Oriented MiddlewarE over/Internet Protocol); (2) an MQTT (Message Queueing Telemetry Transport); (3) an OPC UA (OPC Unified Architecture); and (4) a CoAP (Constrained Application Protocol),
wherein the vehicle-mounted relay device is configured to relay communication data between the plurality of vehicle-mounted devices,
the vehicle-mounted relay device is configured to, before any communication is relayed between the vehicle-mounted devices by the vehicle-mounted relay device, process each of the plurality of vehicle-mounted devices to determine a common protocol that is a common communication protocol among the at least one communication protocol used by each of the plurality of vehicle-mounted devices, and wherein the processing unit notifies each of the plurality of vehicle-mounted devices of the common protocol to be used, and
upon receiving a notification of the common protocol, each of the plurality of vehicle-mounted devices determine whether or not to switch to communication using the common protocol.

15. A communication control method that is performed by a vehicle-mounted relay device included in a vehicle-mounted communication system provided with a plurality of vehicle-mounted devices, each of the plurality of vehicle-mounted devices communicating using at least one communication protocol, the at least one communication protocol selected from a list of communication protocols consisting of: (1) a SOME/IP (Scalable service-Oriented MiddlewarE over/Internet Protocol); (2) an MQTT (Message Queueing Telemetry Transport); (3) an OPC UA (OPC Unified Architecture); and (4) a CoAP (Constrained Application Protocol), wherein the vehicle-mounted relay device relays communication data between the plurality of vehicle-mounted devices, the method comprising:
    a step of selecting, before communication is relayed between the vehicle-mounted devices by the vehicle-mounted relay device, a common protocol that is a common communication protocol among the at least one communication protocol used, by each of the plurality of vehicle-mounted devices, and
    a step of notifying each of the plurality of vehicle-mounted devices of the selected common protocol.

\* \* \* \* \*